United States Patent
Moyer et al.

(10) Patent No.: US 10,346,105 B2
(45) Date of Patent: *Jul. 9, 2019

(54) METHOD AND SYSTEM FOR COMMUNICATING BETWEEN A REMOTE PRINTER AND A SERVER

(71) Applicant: Intellectual Ventures I LLC, Wilmington, DE (US)

(72) Inventors: Alan L. Moyer, Chelmsford, MA (US); Thomas J. LeBlanc, Sudbury, MA (US); Leonid Winestein, Chestnut Hill, MA (US)

(73) Assignee: INTELLECTUAL VENTURES I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,511

(22) Filed: May 25, 2018

(65) Prior Publication Data

US 2018/0373474 A1 Dec. 27, 2018

Related U.S. Application Data

(63) Continuation of application No. 15/265,098, filed on Sep. 14, 2016, now Pat. No. 9,983,836, which is a
(Continued)

(51) Int. Cl.
G06F 15/16 (2006.01)
G06F 3/12 (2006.01)

(52) U.S. Cl.
CPC ............ *G06F 3/1222* (2013.01); *G06F 3/126* (2013.01); *G06F 3/1207* (2013.01);
(Continued)

(58) Field of Classification Search
CPC ..... G06F 3/1236; G06F 3/1237; G06F 312/59
See application file for complete search history.

(56) References Cited

U.S. PATENT DOCUMENTS

| 661,504 A | 11/1900 | Ehlman |
| 1,251,766 A | 1/1918 | Gindele |

(Continued)

FOREIGN PATENT DOCUMENTS

| DE | 26 574 23 A2 | 6/1978 |
| EP | 0 586 903 A2 | 3/1994 |

(Continued)

OTHER PUBLICATIONS

Bannan, K.J., "The Promise and Perils of WAP," Scientific American 283(4):46-49, Oct. 2000.
(Continued)

*Primary Examiner* — Yves Dalencourt
(74) *Attorney, Agent, or Firm* — Christensen O'Connor Johnson Kindness PLLC

(57) ABSTRACT

In order to enable downloading to a mobile printer data items from a server, a method comprising the steps of establishing communication connection end points ("sockets"), communicating with the server, where the communication includes sending a request for authentication to the server, receiving an authentication response, requesting print data portions from the server, receiving the requested print data portions, and notifying the server after each print data portion has been printed. The method also includes the step of terminating their communication connection when a printing session ends or if an error occurs. The method constitutes a printer-server protocol.

20 Claims, 12 Drawing Sheets

Related U.S. Application Data continuation of application No. 14/137,688, filed on Dec. 20, 2013, now Pat. No. 9,448,750, which is a continuation of application No. 13/087,089, filed on Apr. 14, 2011, now Pat. No. 8,645,500, which is a continuation of application No. 12/105,710, filed on Apr. 18, 2008, now Pat. No. 7,958,205, which is a continuation of application No. 10/191,606, filed on Jul. 9, 2002, now Pat. No. 7,383,321.

(52) U.S. Cl.
CPC .......... *G06F 3/1236* (2013.01); *G06F 3/1238* (2013.01); *G06F 3/1259* (2013.01); *G06F 3/1267* (2013.01); *G06F 3/1285* (2013.01); *G06F 3/1287* (2013.01); *G06F 3/1288* (2013.01); *G06F 3/1292* (2013.01)

(56) References Cited

U.S. PATENT DOCUMENTS

| | | |
|---|---|---|
| 1,524,508 A | 11/1922 | Cohen |
| 2,590,678 A | 3/1952 | Cairn |
| 2,854,903 A | 10/1958 | Land et al. |
| 2,930,301 A | 3/1960 | Land et al. |
| 3,047,387 A | 7/1962 | Land |
| 3,079,849 A | 3/1963 | Wareham |
| 3,183,809 A | 5/1965 | Nerwin |
| 3,270,653 A | 9/1966 | Bachelder |
| 3,283,683 A | 11/1966 | Land |
| 3,289,560 A | 12/1966 | Eloranta |
| 3,314,792 A | 4/1967 | Land |
| 3,405,619 A | 10/1968 | Land |
| 3,424,072 A | 1/1969 | Hodgson et al. |
| 3,455,692 A | 7/1969 | Bachelder et al. |
| 3,631,773 A | 1/1972 | Moodie |
| 3,636,845 A | 1/1972 | Harvey |
| 3,643,570 A | 2/1972 | Reid et al. |
| 3,673,939 A | 7/1972 | Harvey |
| 3,754,917 A | 8/1973 | Harvey |
| 3,767,405 A | 10/1973 | Harvey |
| 3,852,781 A | 12/1974 | Erlichman |
| 3,939,781 A | 2/1976 | Adams |
| 4,114,166 A | 9/1978 | Driscoll et al. |
| 4,132,471 A | 1/1979 | Svatek et al. |
| 4,172,647 A | 10/1979 | Gold |
| 4,200,383 A | 4/1980 | Bendoni et al. |
| 4,212,528 A | 7/1980 | Mason |
| 4,248,510 A | 2/1981 | Baker et al. |
| 4,291,966 A | 9/1981 | Bendoni et al. |
| 4,370,045 A | 1/1983 | Holmes |
| 4,488,794 A | 12/1984 | Dolgow et al. |
| 4,569,578 A | 2/1986 | Stella et al. |
| 4,605,608 A | 8/1986 | Bullitt |
| 4,660,951 A | 4/1987 | Reed et al. |
| 4,693,576 A | 9/1987 | Chen |
| 4,829,524 A | 5/1989 | Yoshida |
| 4,855,769 A | 8/1989 | Slavitter et al. |
| 4,884,088 A | 11/1989 | Mauchan |
| 4,951,073 A | 8/1990 | Slavitter |
| 4,962,398 A | 10/1990 | Sorg et al. |
| 5,001,502 A | 3/1991 | Douglas |
| 5,023,636 A | 6/1991 | Douglas |
| 5,040,009 A | 8/1991 | Mizuno |
| 5,049,910 A | 9/1991 | Hsiung |
| 5,073,464 A | 12/1991 | Osawa et al. |
| 5,103,249 A | 4/1992 | Keene |
| 5,176,224 A | 1/1993 | Spector |
| 5,285,894 A | 2/1994 | Kamata et al. |
| 5,292,612 A | 3/1994 | Polizzotto et al. |
| 5,440,366 A | 8/1995 | Reiss et al. |
| 5,453,804 A | 9/1995 | Norris et al. |
| 5,453,957 A | 9/1995 | Norris et al. |
| 5,673,190 A | 9/1997 | Kahleck et al. |
| 5,694,484 A | 12/1997 | Cottrell et al. |
| 5,742,905 A | 4/1998 | Pepe et al. |
| 5,757,976 A | 5/1998 | Shu |
| 5,768,583 A | 6/1998 | Orzol et al. |
| 5,787,237 A | 7/1998 | Reilly |
| 5,799,219 A | 8/1998 | Moghadam et al. |
| 5,806,005 A | 9/1998 | Hull et al. |
| 5,838,999 A | 11/1998 | Norris |
| 5,854,882 A | 12/1998 | Wang |
| 5,855,007 A | 12/1998 | Jovicic et al. |
| 5,859,628 A | 1/1999 | Ross et al. |
| 5,870,633 A | 2/1999 | Norris |
| 5,888,693 A | 3/1999 | Meschter et al. |
| 5,894,546 A | 4/1999 | Yoshida |
| 5,943,511 A | 8/1999 | Farrington et al. |
| 5,973,731 A | 10/1999 | Schwab |
| 5,978,559 A | 11/1999 | Quinion |
| 5,991,290 A | 11/1999 | Malik |
| 5,995,239 A | 11/1999 | Kagawa et al. |
| 6,009,277 A | 12/1999 | Norris |
| 6,032,180 A | 2/2000 | Nishikawa |
| 6,043,898 A | 3/2000 | Jacobs |
| 6,067,532 A | 5/2000 | Gebb |
| 6,072,595 A | 6/2000 | Yoshiura et al. |
| 6,076,068 A | 6/2000 | DeLapa et al. |
| 6,128,415 A | 10/2000 | Hultgren, III et al. |
| 6,134,450 A | 10/2000 | Nordeman |
| 6,166,729 A | 12/2000 | Acosta et al. |
| 6,167,469 A | 12/2000 | Safai et al. |
| 6,202,096 B1 | 3/2001 | Williams et al. |
| 6,215,561 B1 | 4/2001 | Kakutani |
| 6,241,673 B1 | 6/2001 | Williams |
| 6,275,104 B1 | 8/2001 | Holter |
| 6,298,164 B1 | 10/2001 | Suzuki et al. |
| 6,314,476 B1 | 11/2001 | Ohara |
| 6,351,776 B1 | 2/2002 | O'Brien et al. |
| 6,356,356 B1 | 3/2002 | Miller, Jr. et al. |
| 6,381,660 B1 | 4/2002 | Ito |
| 6,397,261 B1 | 5/2002 | Eldridge et al. |
| 6,445,694 B1 | 9/2002 | Swartz |
| 6,453,127 B2 | 9/2002 | Wood et al. |
| 6,473,498 B1 | 10/2002 | Foth |
| 6,526,416 B1 | 2/2003 | Long |
| 6,553,240 B1 | 4/2003 | Dervarics |
| 6,570,640 B1 | 5/2003 | Garfinkle et al. |
| 6,594,032 B1 | 7/2003 | Hiroki et al. |
| 6,623,527 B1 | 9/2003 | Hamzy |
| 6,633,635 B2 | 10/2003 | Kung et al. |
| 6,636,259 B1 | 10/2003 | Anderson et al. |
| 6,657,702 B1 | 12/2003 | Chui et al. |
| 6,662,231 B1 | 12/2003 | Drosset et al. |
| 6,671,063 B1 | 12/2003 | Iida |
| 6,674,539 B1 | 1/2004 | Serra et al. |
| 6,715,003 B1 | 3/2004 | Safai |
| 6,725,051 B2 | 4/2004 | Fidler |
| 6,748,569 B1 | 6/2004 | Brooke et al. |
| 6,757,900 B1 | 6/2004 | Burd et al. |
| 6,785,022 B1 | 8/2004 | Todaka |
| 6,785,542 B1 | 8/2004 | Blight et al. |
| 6,792,577 B1 | 9/2004 | Kimoto |
| 6,795,205 B1 | 9/2004 | Gacek |
| 6,795,852 B1 | 9/2004 | Kleinrock et al. |
| 6,804,534 B2 | 10/2004 | Lai et al. |
| 6,823,457 B1 | 11/2004 | Berstis et al. |
| 6,823,526 B2 | 11/2004 | Howard et al. |
| 6,831,682 B1 | 12/2004 | Silverbrook et al. |
| 6,847,334 B2 | 1/2005 | Hayhurst et al. |
| 6,856,412 B1 | 2/2005 | Keneko |
| 6,892,199 B2 | 5/2005 | Hong et al. |
| 6,906,810 B2 | 6/2005 | Senay et al. |
| 6,922,258 B2 | 7/2005 | Pineau |
| 6,931,432 B1 | 8/2005 | Yoshida |
| 6,937,365 B2 | 8/2005 | Gorian |
| 6,976,084 B2 | 12/2005 | Pineau et al. |
| 6,999,111 B2 | 2/2006 | McIntyre et al. |
| 7,006,242 B2 | 2/2006 | Smith, II et al. |
| 7,010,695 B1 | 3/2006 | Mizuguchi |
| 7,039,033 B2 | 5/2006 | Haller et al. |
| 7,068,846 B1 | 6/2006 | Yaguchi |
| 7,092,119 B1 | 8/2006 | Hinds et al. |

(56) References Cited

U.S. PATENT DOCUMENTS

| | | |
|---|---|---|
| 7,103,905 B2 | 9/2006 | Novak |
| 7,143,141 B1 | 11/2006 | Morgan et al. |
| 7,162,691 B1 | 1/2007 | Chatterjee et al. |
| 7,206,806 B2 | 4/2007 | Pineau |
| 7,210,099 B2 | 4/2007 | Rohrabaugh et al. |
| 7,272,390 B1 | 9/2007 | Adachi et al. |
| 7,272,788 B2 | 9/2007 | Anderson et al. |
| 7,281,034 B1 | 10/2007 | Eyal |
| 7,383,321 B2 | 6/2008 | Moyer et al. |
| 7,747,699 B2 | 6/2010 | Prueitt et al. |
| 7,958,205 B2 | 6/2011 | Moyer et al. |
| 9,448,750 B2 | 9/2016 | Moyer et al. |
| 9,983,836 B2 * | 5/2018 | Moyer .................. G06F 3/1222 |
| 2001/0019964 A1 | 9/2001 | Shimizu |
| 2001/0021664 A1 | 9/2001 | Kikinis |
| 2001/0024518 A1 | 9/2001 | Yaguchi |
| 2001/0042010 A1 | 11/2001 | Hassell |
| 2001/0052942 A1 | 12/2001 | MacCollum et al. |
| 2001/0054066 A1 | 12/2001 | Spitzer |
| 2002/0040332 A1 | 4/2002 | Maari et al. |
| 2002/0042884 A1 | 4/2002 | Wu et al. |
| 2002/0049837 A1 | 4/2002 | Kato |
| 2002/0051197 A1 | 5/2002 | Minegishi |
| 2002/0051200 A1 | 5/2002 | Change et al. |
| 2002/0054345 A1 | 5/2002 | Tomida et al. |
| 2002/0060808 A1 | 5/2002 | Henderson et al. |
| 2002/0062397 A1 | 5/2002 | Chang et al. |
| 2002/0062406 A1 | 5/2002 | Chang et al. |
| 2002/0065101 A1 | 5/2002 | Picoult et al. |
| 2002/0065873 A1 | 5/2002 | Ishizuka |
| 2002/0075510 A1 | 6/2002 | Martinez |
| 2002/0077974 A1 | 6/2002 | Ortiz |
| 2002/0078160 A1 | 6/2002 | Kemp et al. |
| 2002/0078343 A1 | 6/2002 | Rubin et al. |
| 2002/0078352 A1 | 6/2002 | Angwin et al. |
| 2002/0091527 A1 | 7/2002 | Shiau |
| 2002/0091738 A1 | 7/2002 | Rohrabaugh et al. |
| 2002/0100802 A1 | 8/2002 | Sehr |
| 2002/0104099 A1 | 8/2002 | Novak |
| 2002/0113994 A1 | 8/2002 | Smith et al. |
| 2002/0124059 A1 | 9/2002 | Takahashi |
| 2002/0161856 A1 | 10/2002 | Pineau et al. |
| 2002/0169002 A1 | 11/2002 | Imbrie et al. |
| 2002/0169851 A1 | 11/2002 | Weathersby et al. |
| 2002/0171857 A1 | 11/2002 | Hisatomi et al. |
| 2002/0174205 A1 | 11/2002 | Nakashima |
| 2002/0181010 A1 | 12/2002 | Pineau |
| 2002/0181023 A1 | 12/2002 | Gorian et al. |
| 2002/0184302 A1 | 12/2002 | Prueiu et al. |
| 2002/0184307 A1 | 12/2002 | Pineau |
| 2002/0184318 A1 | 12/2002 | Pineau |
| 2002/0184378 A1 | 12/2002 | Pineau et al. |
| 2002/0186404 A1 | 12/2002 | Gragg |
| 2002/0188673 A1 | 12/2002 | Coimson |
| 2003/0002072 A1 | 1/2003 | Berkema et al. |
| 2003/0004859 A1 | 1/2003 | Shaw et al. |
| 2003/0005050 A1 | 1/2003 | Pineau et al. |
| 2003/0037076 A1 | 2/2003 | Bravery et al. |
| 2003/0038963 A1 | 2/2003 | Yamaguchi |
| 2003/0046268 A1 | 3/2003 | Hirabayashi |
| 2003/0069780 A1 | 4/2003 | Hailwood et al. |
| 2003/0081788 A1 | 5/2003 | Simpson et al. |
| 2003/0084016 A1 | 5/2003 | Norgaard et al. |
| 2003/0090707 A1 | 5/2003 | Simpson et al. |
| 2003/0093756 A1 | 5/2003 | Behzadi et al. |
| 2003/0105887 A1 | 6/2003 | Cox et al. |
| 2003/0105963 A1 | 6/2003 | Slick et al. |
| 2003/0107529 A1 | 6/2003 | Hayhurst et al. |
| 2003/0115250 A1 | 6/2003 | Bernier et al. |
| 2003/0140095 A1 | 7/2003 | Simpson et al. |
| 2003/0149573 A1 | 8/2003 | Lynton |
| 2003/0184793 A1 | 10/2003 | Pineau |
| 2004/0010540 A1 | 1/2004 | Puri et al. |
| 2004/0010567 A1 | 1/2004 | Moyer et al. |
| 2004/0019628 A1 | 1/2004 | Puri et al. |
| 2004/0201613 A1 | 10/2004 | Simpson et al. |
| 2005/0010587 A1 | 1/2005 | Matsubayashi et al. |
| 2005/0024499 A1 | 2/2005 | Luciano et al. |
| 2005/0231761 A1 | 10/2005 | Pineau |
| 2005/0235202 A1 | 10/2005 | Chen et al. |

FOREIGN PATENT DOCUMENTS

| | | |
|---|---|---|
| EP | 0 598 513 A1 | 5/1994 |
| EP | 0 738 956 A2 | 10/1996 |
| EP | 0 745 924 A2 | 12/1996 |
| EP | 0 830 000 A2 | 3/1998 |
| EP | 0 855 835 A2 | 7/1998 |
| EP | 0 862 104 A2 | 9/1998 |
| EP | 0 872 792 A2 | 10/1998 |
| EP | 0 930 774 A2 | 7/1999 |
| EP | 1 063 597 A2 | 12/2000 |
| EP | 1 075 138 A2 | 2/2001 |
| EP | 1 093 288 A2 | 4/2001 |
| EP | 1 100 003 A2 | 5/2001 |
| EP | 1 109 113 A2 | 6/2001 |
| EP | 1 117 271 A1 | 7/2001 |
| EP | 1 120 718 A1 | 8/2001 |
| EP | 1 132 839 A1 | 9/2001 |
| EP | 1 176 500 A1 | 1/2002 |
| FR | 2 775 406 A1 | 8/1999 |
| GB | 2 287 623 A | 9/1995 |
| GB | 2 303 478 A | 2/1997 |
| GB | 2 347 766 A | 9/2000 |
| JP | 1086660 A | 3/1989 |
| JP | 11/66823 A | 6/1989 |
| JP | 1/200865 A | 8/1989 |
| JP | 5244629 A | 9/1993 |
| JP | 5255629 | 10/1993 |
| JP | 6310322 A | 11/1994 |
| JP | 10-069553 A | 3/1998 |
| JP | 10191453 A | 7/1998 |
| JP | 10-289171 A | 10/1998 |
| JP | 11-313107 A | 11/1999 |
| JP | 2000-53276 A | 2/2000 |
| JP | 2000-066866 A | 3/2000 |
| JP | 2000-99079 A | 4/2000 |
| JP | 2000-207145 A | 7/2000 |
| JP | 2000-222160 A | 8/2000 |
| JP | 2000-312260 A | 11/2000 |
| JP | 2000-339237 A | 12/2000 |
| JP | 2001-057534 A | 2/2001 |
| JP | 2001-076058 A | 3/2001 |
| JP | 2001-103233 A | 4/2001 |
| JP | 2001-118010 A | 4/2001 |
| JP | 2001-167024 A | 6/2001 |
| JP | 2001-207145 A | 7/2001 |
| JP | 2001-236183 A | 8/2001 |
| JP | 2001-245028 A | 9/2001 |
| JP | 2001-249899 A | 9/2001 |
| JP | 2001-256161 A | 9/2001 |
| JP | 2001-285418 A | 10/2001 |
| JP | 2001-313913 A | 11/2001 |
| JP | 2001-344435 A | 12/2001 |
| JP | 2002-056023 A | 2/2002 |
| JP | 2002-073505 A | 3/2002 |
| JP | 2002-073561 A | 3/2002 |
| WO | 95/30199 A1 | 11/1995 |
| WO | 96/13814 A1 | 5/1996 |
| WO | 98/19478 A1 | 5/1998 |
| WO | 00/01138 A2 | 1/2000 |
| WO | 00/48384 A2 | 8/2000 |
| WO | 00/72499 A1 | 11/2000 |
| WO | 01/03040 A1 | 1/2001 |
| WO | 01/13307 A1 | 2/2001 |
| WO | 01/16853 A1 | 3/2001 |
| WO | 01/20509 A1 | 3/2001 |
| WO | 01/50446 A1 | 7/2001 |
| WO | 01/73644 A2 | 10/2001 |
| WO | 01/77845 A1 | 10/2001 |
| WO | 01/95267 A1 | 12/2001 |
| WO | 02/01451 A1 | 1/2002 |
| WO | 02/08926 A1 | 1/2002 |
| WO | 02/09435 A1 | 1/2002 |

(56) References Cited

FOREIGN PATENT DOCUMENTS

| WO | 02/89463 A1 | 11/2002 |
|---|---|---|
| WO | 02/98107 A1 | 12/2002 |
| WO | 02/98124 A2 | 12/2002 |
| WO | 03/052580 A2 | 6/2003 |
| WO | 03/052581 A1 | 6/2003 |
| WO | 03/67496 A2 | 8/2003 |
| WO | 03/79279 A1 | 9/2003 |
| WO | 04/06085 A1 | 1/2004 |
| WO | 04/06155 A1 | 1/2004 |
| WO | 04/06543 A1 | 1/2004 |

OTHER PUBLICATIONS

"Barcoded E-Tickets and Coupons on I-Mode," MobileMediaJapan.com, Oct. 14, 2000, <www.eurotechnology.com>, pp. 1-3.
Bos, B., "XML in 10 Points," W3C®, <http://www.w3.org/XML/1999/XML-in-10-points>, created Mar. 1999, updated Nov. 2001, 3 pages.
Bosak, J., "XML: The Universal Publishing Format," SGML/XML Europe '98, Paris, May 19, 1998, 35 pages.
Charny, B., "Ready for Photos on Your Phone?" CNET News.com, Jun. 20, 2002, pp. 1-2.
"Displaying XML With CSS," W2Schools.com, <http://www.w2schools.com/xml/xml_display.asp> [retrieved Apr. 11, 2002], 10 pages.
"Ephoto Instant Photo-Messaging System," LightSurf Technologies Inc., 1998-2002, 1 page.
"Extensible Markup Language (XML) 1.0 (Second Edition)," W3C Recommendation, Oct. 6, 2000, 40 pages.
Faber, T., et al., "The Time-Wait State in TCP and Its Effect on Busy Servers," 18th Annual Joint Conference of the IEEE Computer and Communications Societies (INFOCOM '99), New York, Mar. 21-25, 1999, pp. 1-18.
"Frequently Asked Questions," Xdrive.com, Apr. 8, 2000, <http://webarchive.org/web/20000408223752/http://www.xdrive.com/company/faq.html>, pp. 1-4.
Fung, C.C., et al., "Intelligent Meters for Improved System Operation and Customer Relationship Management," International Conference on Power System Technology (PowerCon 2002), May 2002, vol. 3, pp. 1758-1762.
Harvey, F., "The Internet in Your Hands," Scientific American 283(4):40-45, May 2002.
Landis Communications, "National Bike Registry Teams Up With Kryptonite to Reduce Bike Theft," Business Wire, Nov. 1, 2000, pp. 1-2.
Martin, D., "What Place Has CSS in the XML World?" O'Reilly, XML.com, Mar. 8, 2000 [retrieved Jan. 9, 2009], 3 pages.
Meyer, E.A., "Cascading Style Sheets: The Definitive Guide," O'Reilly Media, Sebastopol, Calif., 2000, 18 pages.
PCT International Preliminary Examination Report dated Apr. 6, 2010, in corresponding International Application No. PCT/US02/040549, filed Dec. 18, 2002, 3 pages.
PCT International Preliminary Examination Report dated Mar. 21, 2003, in corresponding International Application No. PCT/US02/15785, filed May 17, 2002, 2 pages.
PCT International Preliminary Examination Report dated Oct. 15, 2007, in corresponding International Application No. PCT/US03/02820, filed Jan. 30, 2003, 3 pages.
PCT International Search Report dated Aug. 18, 2004, in corresponding International Application No. PCT/US03/15557, filed May 15, 2003, 3 pages.
PCT International Search Report dated Feb. 16, 1998, in corresponding International Application No. PCT/US97/19398, filed Oct. 29, 1997, 3 pages.
PCT International Search Report dated Feb. 16, 1998 in corresponding International Application No. PCT/US97/19397, filed Oct. 29, 1997, 2 pages.
PCT International Search Report dated Jan. 10, 2003, in corresponding International Application No. PCT/US02/18527, filed May 17, 2002, 6 pages.
PCT International Search Report dated Jul. 1, 2003, in corresponding International Application No. PCT/US03/07125, filed Mar. 10, 2003, 1 page.
PCT International Search Report dated Jul. 15, 2003, in corresponding International Application No. PCT/US02/040549, filed Dec. 18, 2002, 3 pages.
PCT International Search Report dated Jul. 15, 2003, in corresponding International Application No. PCT/US02/40548, filed Dec. 18, 2002, 2 pages.
PCT International Search Report dated Jul. 30, 2002, in corresponding International Application No. PCT/US02/11354, filed Apr. 11, 2002, 4 pages.
PCT International Search Report dated Nov. 18, 2004, in corresponding International Application No. PCT/US03/02820, filed Jan. 30, 2003, 1 page.
PCT International Search Report dated Sep. 10, 2003, in corresponding International Application No. PCT/US03/15250, filed May 15, 2003, 3 pages.
PCT International Search Report dated Sep. 12, 2003, in corresponding International Application No. PCT/US03/15556, filed May 15, 2003, 3 pages.
PCT International Search Report dated Sep. 5, 2002, in corresponding International Application No. PCT/US02/15785, filed May 17, 2002, 3 pages.
Pineau, R.A., "Method and Apparatus for Printing Remote Images Using a Network-Enabled Printer," U.S. Appl. No. 11/955,768, filed Dec. 13, 2007, 8 pages.
Shah, B., "Presenting XML to the Web," XML Journal 1(1):18-23, Mar. 2000.
St. Pierre, P., et al., "Service Printer Template," The Internet Society Online, 2000, pp. 1-13.
"Thai Govt. Prepares to Launch Online Services Getaway," Newsbytes News Network, Newsbytes.com, Jul. 31, 2000, pp. 1-2.
Ticketmaster.com, Order Page, www.ticketmastercom, © 1999-2012, pp. 1-3.
Williams, R., "A Painless Guide to CRC Error Detection Algorithms," Aug. 19, 1993, <http://www.geocites.com/SiliconValleyPines/8659/crc.htm>, pp. 1-3.
"Wireless Application Protocol (WAP)," <http://www.iit.edu/diazrob/wap/html>, 1998, pp. 1-7.
Yahoo, Inc., "Yahoo! Photos—Photos Help," Yahoo! Photos, Apr. 13, 2001, pp. 1-27.
Yan, L., et al., "Improving Prediction of Customer Behavior in Nonstationary Environments," Proceedings of the International Joint Conference on Neural Networks (IJCNN '01), Washington, D.C., Jul. 15-19, 2001, vol. 3, pp. 2258-2263.
International Search Report dated Jan. 29, 2004, issued in International Application No. PCT/US2003/015558, filed May 15, 2003, 3 pages.

\* cited by examiner

METHOD AND SYSTEM FOR COMMUNICATING BETWEEN A REMOTE PRINTER AND A SERVER

CROSS REFERENCE TO RELATED APPLICATIONS

This application is a continuation of U.S. patent application Ser. No. 15/265,098, filed Sep. 14, 2016, which is a continuation of U.S. patent application Ser. No. 14/137,688, filed Dec. 20, 2013, now U.S. Pat. No. 9,448,750, issued Sep. 20, 2016, which is a continuation of U.S. patent application Ser. No. 13/087,089, filed Apr. 14, 2011, now U.S. Pat. No. 8,645,500, issued Feb. 4, 2014, which is a continuation of U.S. patent application Ser. No. 12/105,710, filed Apr. 18, 2008, now U.S. Pat. No. 7,958,205, issued Jun. 7, 2011, which is a continuation of U.S. application Ser. No. 10/191,606, filed Jul. 9, 2002, now U.S. Pat. No. 7,383,321, issued Jun. 3, 2008, each of which is hereby incorporated by reference in its entirety. This application is also related to the following commonly-owned patent applications, each of which is hereby incorporated by reference in its entirety:

U.S. application Ser. No. 09/870,538, filed May 30, 2001, entitled "Method and System for Generating a Permanent Record of a Service Provided to a Mobile Device," now U.S. Pat. No. 7,747,699, issued Jun. 29, 2010;

U.S. application Ser. No. 10/022,924, filed Dec. 18, 2001, entitled "Method and Apparatus for Printing Remote Images Using a Network-Enabled Printer," now U.S. Pat. No. 6,976,084, issued Dec. 13, 2005;

U.S. application Ser. No. 10/024,068, filed Dec. 18, 2001, entitled "Method and Apparatus for Printing Remote Images Using a Mobile Device and Printer," now abandoned and replaced by continuation application Ser. No. 11/150,948, filed Jun. 13, 2005, entitled "Method and Apparatus for Providing Output From Remotely Located Digital Files Using a Mobile Device and Output Device," now abandoned;

U.S. application Ser. No. 10/191,161, filed Jul. 9, 2002, entitled "Method and Apparatus for Providing Output from Remotely Located Digital Files Using a Remote Printer," now abandoned; and U.S. application Ser. No. 10/191,892, filed Jul. 9, 2002, entitled "System for Remotely Rendering Content for Output by a Printer," now abandoned.

TECHNICAL FIELD

The present invention relates to techniques for printing digital images and, more particularly, to techniques for communicating between a remote printer having communication capabilities and a server.

BACKGROUND

The Internet, and in particular the World Wide Web (the "Web"), is increasingly being used to store and exchange information and to perform commercial transactions. Although the Web was originally only capable of storing and displaying textual information, the Web may now be used to store, display, and exchange a wide variety of textual, graphical, and audiovisual information such as digital images and full-motion video.

Digital photography, for example, is becoming increasingly popular, spurred in large part by the advent of low-cost, high-quality digital cameras. An increasing number of web sites allow users to upload digital photographs and other digital images to the Web, whereby such images may subsequently be viewed, shared, edited, and printed on conventional printers using computers connected to the Web using conventional Internet connections.

To print a digital image from the Web, a user must typically use a conventional desktop or laptop computer to establish a Web connection using a conventional modem or other network connection device. The user must then locate the digital image (such as a digital photograph) to be printed or complete a transaction that produces an image (such as a ticket) to be printed. The user must then typically download the located image from the Web site to the computer. To print the image, the user must typically issue a "print" command to the Web browser or other software executing on the computer.

Such a process can be cumbersome for the user and may restrict the range of circumstances in which the user may print digital images from the Web. For example, the conventional method described above involves several discrete steps, each of which must be initiated by the user: locating the desired image, downloading the image to a host computer, and issuing a print command to print the image.

Locating the desired image may be difficult if the user does not know or remember the precise Web address of the image to be printed. Even if the user does remember, for example the address of the home page of the Web site on which the image is stored, it may be necessary for the user to perform several steps to navigate a Web browser to the precise image to be downloaded.

If the image to be printed cannot be printed directly from the Web page on which it is stored, it may be necessary for the user to download the image to the host computer. This may require the user to perform several steps, such as selecting the image, providing a filename for the image, and selecting a location on a local storage device (such as a hard disk drive) on which the image is to be stored.

Printing the image may also be problematic. For example, if the image has been downloaded to a local storage device, the user may have to locate the image on the storage device and open the image file using imaging software before issuing a print command. The print command may fail for a variety of reasons, such as a faulty connection between the host computer and the printer or the absence of an appropriate printer driver on the host computer. After printing the image, the user typically must manually delete the downloaded image file from the local storage device.

In particular, it may be difficult and/or time consuming for a user to print images that are generated as a result of a non-Web transaction. Consider, for example, a user who purchases a ticket (such as a concert ticket or airline ticket) over the telephone. If such a transaction generates a ticket that is accessible over the Web for printing, the conventional system described above would require the user to connect the host computer to the Web, locate the image of the ticket using a Web browser, and print the image. Such a process requires the user to engage in a significant amount of post-transaction activity and may be particularly difficult for those users who have chosen to conduct the transaction (e.g., purchase the ticket) over the telephone because they are not familiar with using computers in general or the Web in particular. Users who are unable to print the resulting ticket may become dissatisfied with the associated service and fail to become repeat customers.

It should therefore be apparent that the process of printing images from the Web using a conventional computer connected to a conventional printer can be a tedious, time-consuming, and error-prone process.

Furthermore, the requirement that the printer be connected to a host computer has a variety of disadvantages. For example, a mobile computer user who desires the ability to print images from a variety of locations (such as at home and at the office) must have access to a Web-connected computer in each such location. Using the techniques described above, even a small mobile printer must be connected to a computer to print images from the Web. As a result, a user who wishes to print such remote images may be required to travel with both a printer and a laptop computer, or may be limited to printing images from locations at which a Web-connected desktop computer is available. The requirement that the printer be connected to a computer therefore limits the mobility of the user and limits the range of locations from which images may be remotely printed.

What is needed, therefore, are improved techniques for downloading and printing digital images.

In concurrently filed application Ser. No. 10/191,161, entitled "Method and Apparatus for Providing Output from Remotely Located Digital Files Using a Remote Printer", techniques are disclosed for coupling a printer to a communications network (such as a Plain Old Telephone Service network or wireless voice or data networks), downloading printing information (such as a digital image) to the printer over the communications network, and using the printer to print output based on the printing information. The printer includes a network communications device, such as a modem, that enables the printer to connect directly to the communications network. The printing information may be downloaded to the printer in any of a variety of ways. For example, the printer may establish a connection to a printing server that serves the printing information. A connection between the printer and the printing server may be established, for example, by using the printer to place a telephone call to the printing server over a Plain Old Telephone Service (POTS) network. The printer may then download the printing information over the POTS network and print the image specified by the printing information.

Data communications over telephone and wireless connections can be unreliable. There is a need for a protocol for communicating between the printer and the printing server that ensures reliable communication and allows the transmission of information that restart at the point of interruption if interrupted.

It is an object of this invention to provide one embodiment of a protocol for communicating between the printer and the printing server that ensures reliable communication.

It is a further object of this invention to provide a protocol that allows the printing of documents with multiple pages and provides error checking.

It is also an object of this invention to provide a protocol that enables the communicating of the state of previous prints between the printer and the server and to provide secure access to this information.

SUMMARY

The objects set forth above as well as further and other objects and advantages of the present invention are achieved by the embodiments of the invention described hereinbelow.

In order to enable downloading to a mobile printer data items from a server, a method comprising the steps of establishing communication connection end points ("sockets"), communicating with the server, where the communication includes sending a request for authentication to the server, receiving an authentication response, requesting print data portions from the server, receiving the requested print data portions, and notifying the server after each print data portion has been validated and printed is disclosed. The method also includes the step of terminating their communication connection when a printing session ends or if the time between commands received from the printer exceeds a constant timeout period or if an error occurs. In the authentication process, the server receives the characteristics of the mobile printer and the characteristics are compared to a database at the server thereby enabling the server to identify printing preferences. Knowledge of the printer characteristics and the printing preferences enables the preparing of documents to be printed at a specific mobile printer and the processing the documents to achieve optimum quality prints. If the printer is not registered (not found in the database), the remote printer will be registered automatically during authentication. In addition, as part of the authentication process, the printer transmits information to the server that allows the determining of print completion failures. Following this determination of print completion failures, the server can provide the mobile printer with the previously attempted print data and the printer can re-attempt printing. In the process of requesting print data portions from the server, the printer can request a partial print data portion. Requesting and receiving partial print data portions, renders the printer-server connection robust against noisy transmission and transmission interruption. Robustness against transmission errors is further enhanced by the use of security indicators. A security indicator is calculated at the server for each data portion and communicated to the remote printer along with the data portion. At the printer, the security indicator is calculated again and compared to the one received from the server. The security indicator can be a cyclic redundancy code (CRC), a digital signature such as that calculated by means of the MD5 message digest algorithm or just a known number (a so called Magic number) or a combination of the these. (A Magic number is a known, fixed number that is used to verify that the data stream is synchronized at the send/receive ends and that the data to follow is as expected.)

The above-described method constitutes a printer-server protocol and is implemented in a computer readable code. The computer readable code is embodied in a computer usable memory. Both the server and the printer include computer usable memories in which the computer readable code that implements the protocol is embodied.

The use of the printer server protocol of this invention obviates the need for a printer driver and enables the operation of the printer without a companion computer. Thus, the remote printer with communication capabilities can be connected to a network, and connected through the network to the server. The printer can be used anywhere, can be connected to a wireless phone or to a telephone network (POTS network) and data downloaded and printed.

To enable the remote operation of the printer (without a companion computer), complete two-way communication between the printer and the server is needed. The invention disclosed herein enables complete two-way communication between output devices and servers and supports the ability to continue transmission of data if the transmission was previously interrupted.

Although the printer is described herein as a device for printing images, it should be appreciated that more generally the term "printer" is used herein to refer to any device for receiving input and producing hard or soft copy output. Such input/output may include not only static images but also an audiovisual stream (which may include an audio stream, a video stream, or any combination thereof). It should therefore be appreciated that the term "image" (when referring, for example, to stored images and a printed image) may refer not only to a static image, but to any of the kinds of information that the printer may receive and output. The printer may, for example, be a CD drive (such as a CD-ROM, CD-R, or CD-RW drive), DVD player, or MP3 player that includes a network communications device and performs the other functions of the printer that are described herein.

For a better understanding of the present invention, together with other and further objects thereof, reference is made to the accompanying drawings and detailed description and its scope will be pointed out in the appended claims.

DETAILED DESCRIPTION OF ILLUSTRATIVE EMBODIMENTS

Figure 1:
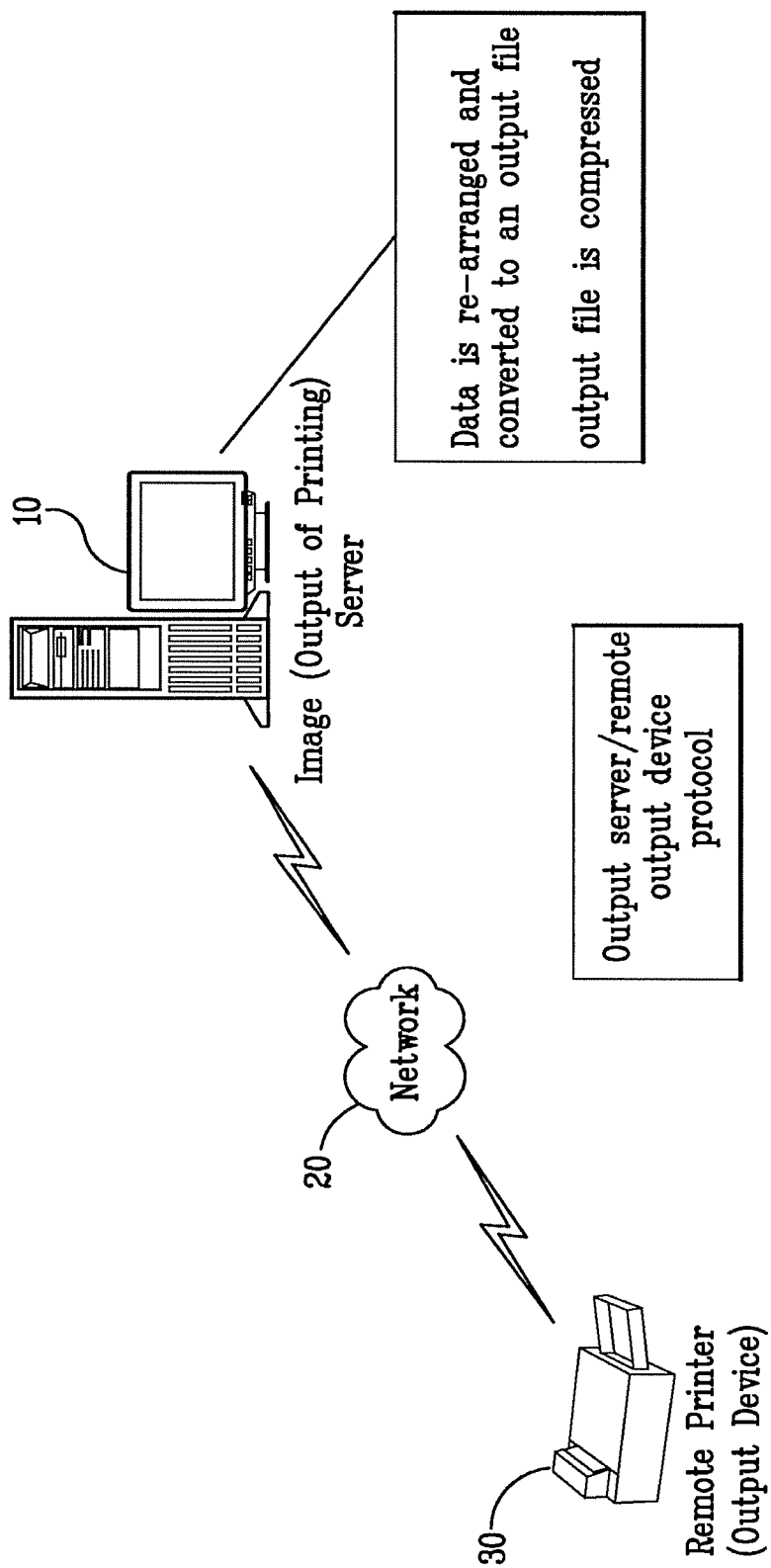
FIG. 1 is a graphical representation of a printer-server system embodying this invention.

Data received at server 10, as shown in FIG. 1, is provided to remote printer 30 via a network 20. Such a system is disclosed in the above referenced U.S. patent application Ser. No. 10/191,161, entitled "Method and Apparatus for Providing Output from Remotely Located Digital Files Using a Remote Printer". Once received at the output (or printing) server 10, the data is processed, rearranged and converted into a form suitable for output. One embodiment of method of rearranging and converting the data in the data structure and into a form suitable for printing (output) is described in the above-referenced U.S. patent application Ser. No. 10/191,892. The processed, rearranged and converted information is then provided to the mobile printer 30 (output device, herein after also referred to as "printer") over the network 20 (where the network can be a POTS network or a wireless voice or data network). An embodiment of a protocol for communicating between printer 30 and server 10 is disclosed herein.

Figure 2:
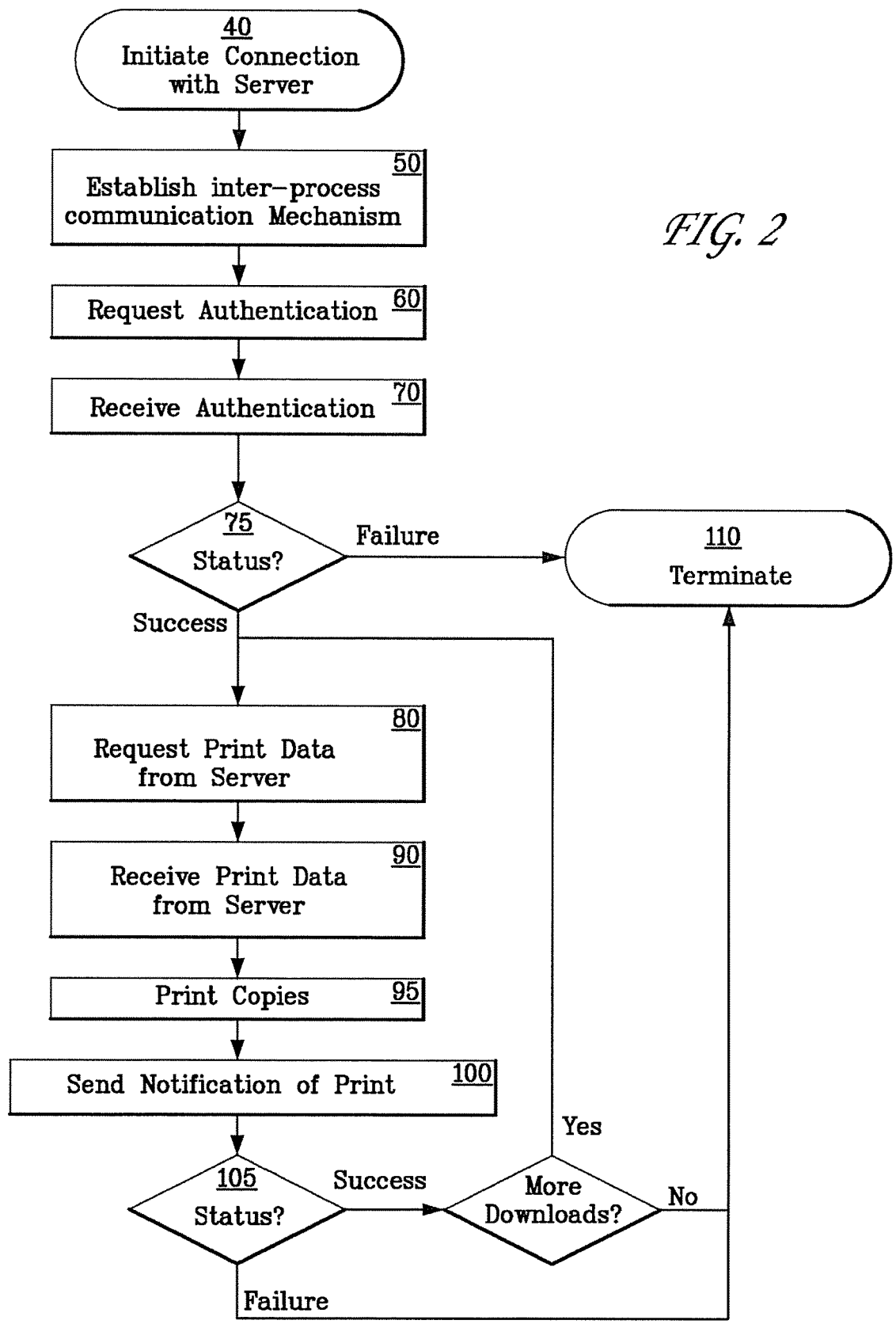
FIG. 2 is a flowchart of an embodiment of the method of this invention as applied at the remote printer.

A method that enables downloading, to the printer 30, data items from the server 10 is shown in FIG. 2. The printer 30 initiates a connection to the server 10 over the network 20 (step 40, FIG. 2). The connection can be initiated via a telephone call or by other means to access a system via a network such as those used in computer networks. The printer 30 then establishes an interprocess communication mechanism at one end of the interprocess communication channel (for example, "a socket") comprising a connection end point and a network address, the network address identifying the server 10 in the network 20 (step 50, FIG. 2). "Sockets" are the most common mechanism and method for two programs at different locations in a network to communicate. "Sockets" are supported in most operating systems, such as UNIX, Windows, MS-DOS, MacOS. (In non-technical terms, sockets are akin to telephone connections to allow one program or process to communicate with another.) "Sockets" are established and used with a set of functions termed the sockets application programming interface (API) which is provided by the operating system. A typical socket API has the following major functions: a function for creating a socket; a bind function for binding a socket to an end point of a known protocol/port; a listen function for placing a socket bound to a known port in a passive mode; an accept function for accepting incoming connections from a passive socket; a connect function for opening active connections to remote endpoints; a read function for reading data from existing connections; a write function for writing data to existing connections; and a function for closing existing connections. After the interprocess communication mechanism ("socket") is established, the printer 30 then communicates with the server 10. The communication between printer 30 and server 10 comprises authentication (steps 60 and 70, FIG. 2) and the request (step 80, FIG. 2) and receipt (step 90, FIG. 2) of print data. After printing the print data, the printer 30 sends a print notification to the server 10 (step 100, FIG. 2). Upon completion of the printing session or if an error occurs in transmission, the communication session terminates (step 110, FIG. 2) by closing the socket and disconnecting the network connection.

Figure 3:
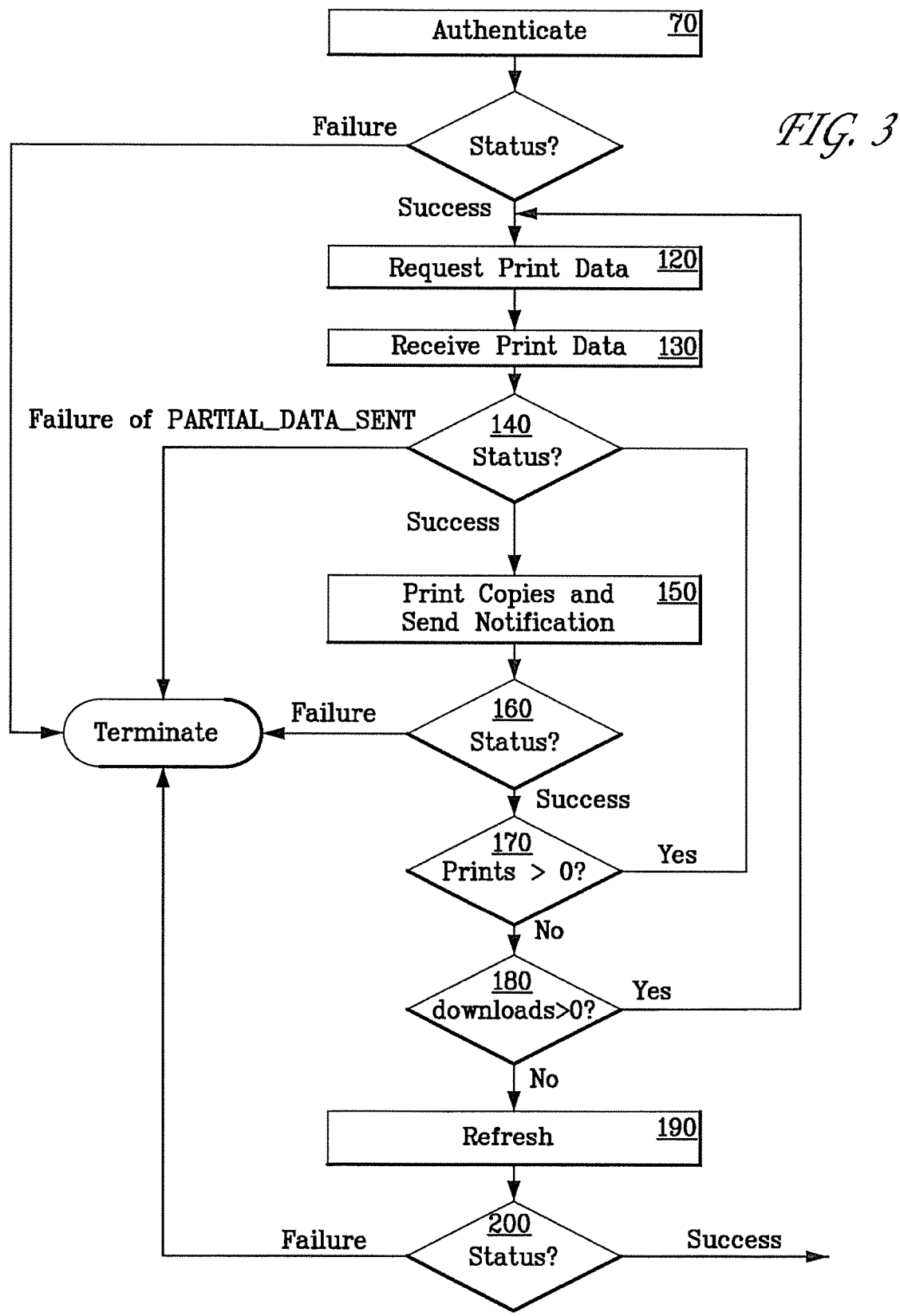
FIG. 3 is a flowchart of an embodiment of the method of this invention at the remote printer depicting a more detailed representation of method for receiving subsequent print data portions.

It should be apparent that a printing session can involve printing multiple documents. FIG. 3 provides a more detailed description of the steps of requesting from the server 10 print data portions and in receiving from the server 10 print data portions. Following a request for authentication (step 60, FIG. 2), the server 10 provides a response (step 70, FIG. 2) including status information, a specified number for the data items to be printed, and a specified number for the print data portions to be downloaded. The printer 30 then: (a) requests from the server 10 one print data portion (step 120, FIG. 3); (b) receives a response from the server 10 including the one print data portion, a specified number of copies to be printed of that one print data portion, and a transmission status for the data portion request (step 130, FIG. 3); (c) terminates the communications connection if the transmission status indicates a transmission failure (step 140, FIG. 3); (d) prints the one print data portion, if the transmission status indicates a transmission success (step 150, FIG. 3); (e) sends a notification of print completion to the server upon completion of printing (step 150, FIG. 3); and, (f) terminates the communications connection if print completion was not successful (step 160, FIG. 3). In order to print a specified number of copies of one print data portion, in step (g) steps (d) through (f) are repeated until the specified number of copies to be printed of that one print data portion are printed, unless print completion is not successful for any copy (step 170, FIG. 3). In order to download the specified number of print data portions to be downloaded, steps (a) through (g) are repeated until the specified number of print data portions to be down loaded has been downloaded (step 180, FIG. 3).

For simplicity, FIG. 3 indicates that all the copies of the last downloaded print data portion are to be printed before attempting to download a new print data portion. However, this not required. If the printer has sufficient CPU and memory resources, it can begin downloading the next print data portion while it is printing the current one. It is only necessary to send notification of print completion for each actual hard copy print made as soon as possible and keep track of additional variables that differentiate between the print data portion already downloaded and the print data portion in process of being downloaded. In this case, sending notification of print completion must be delayed until the next print data portion has been received since the printer API cannot return from sending a notification of print completion until it receives a response from the server and the next print data portion will still be in the input socket stream until that call completes.

Figure 4:
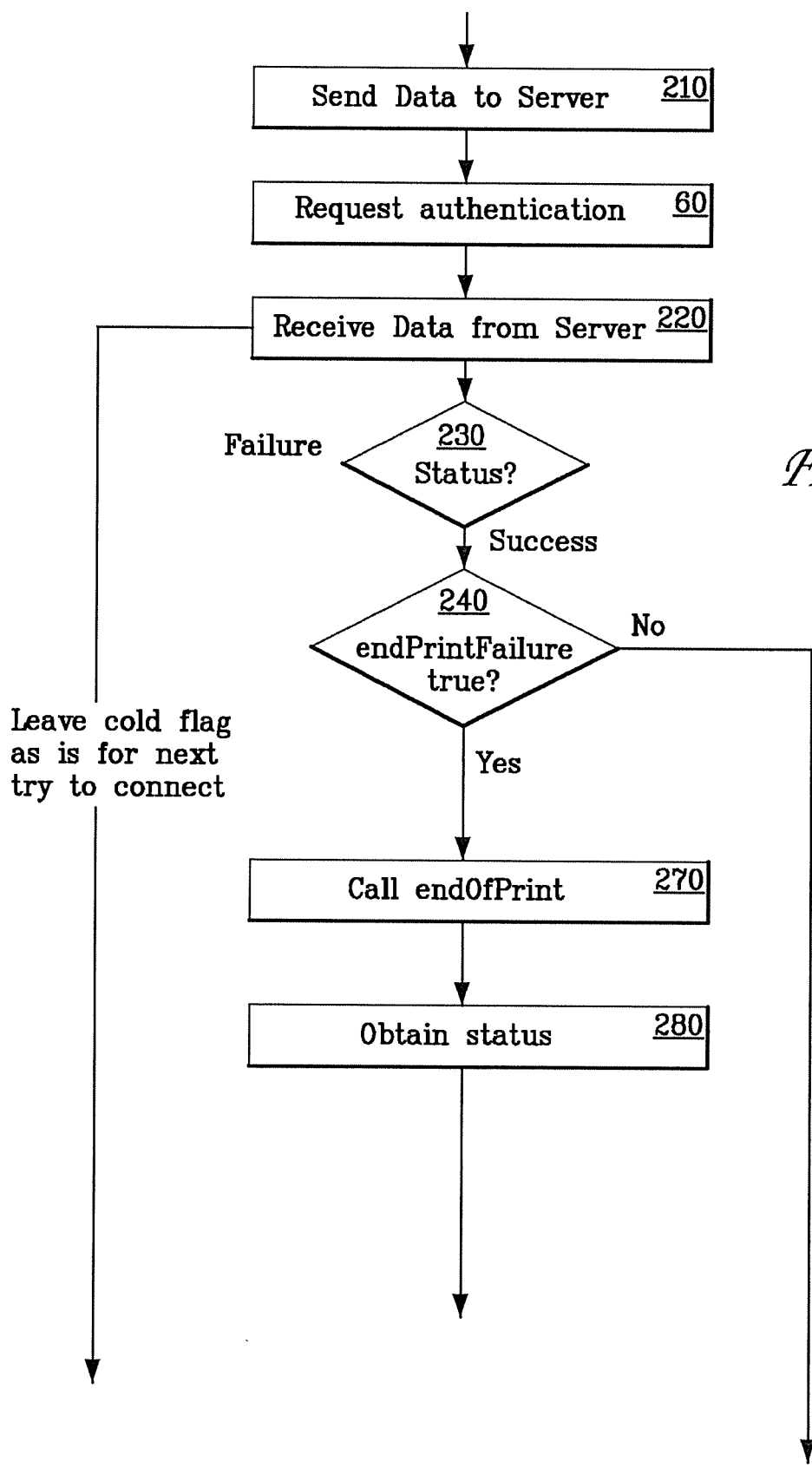
FIG. 4 is a flowchart of an embodiment of the method of this invention at the remote printer depicting a more detailed representation of method for receiving from the server an authentication response.

Authentication (steps 60 and 70, FIG. 2) is described in more detail in FIG. 4. When the printer 30 send a request for authentication to the server 10 (steps 60, FIG. 2), the printer 30 also sends to the server 10 data identifying the characteristics of the printer (step 210, FIG. 4). When the printer 30 receives the response from the server (step 70, FIG. 2), the printer 30 receives, from the server, status information, a specified number for the data items to be printed and, a specified number for the print data portions to be downloaded (step 220, FIG. 4). The status information is examined (step 230, FIG. 4) to determine success or failure of authentication. If the printer determines that a failure occurred, the connection is terminated (step 110, FIG. 2). If status indicates a success, the printer 30 determines if the previous communication connection resulted in a notification of print completion indicating a print completion failure (step 240, FIG. 4). If the previous communication connection resulted in a notification of print completion failure, the printer 30 attempts to notify the server 10 by performing the following steps:

the printer 30 sends a notification of print completion to the server (step 280, FIG. 4);

and, it receives from the server status information (step 280, FIG. 4).

Figure 5:
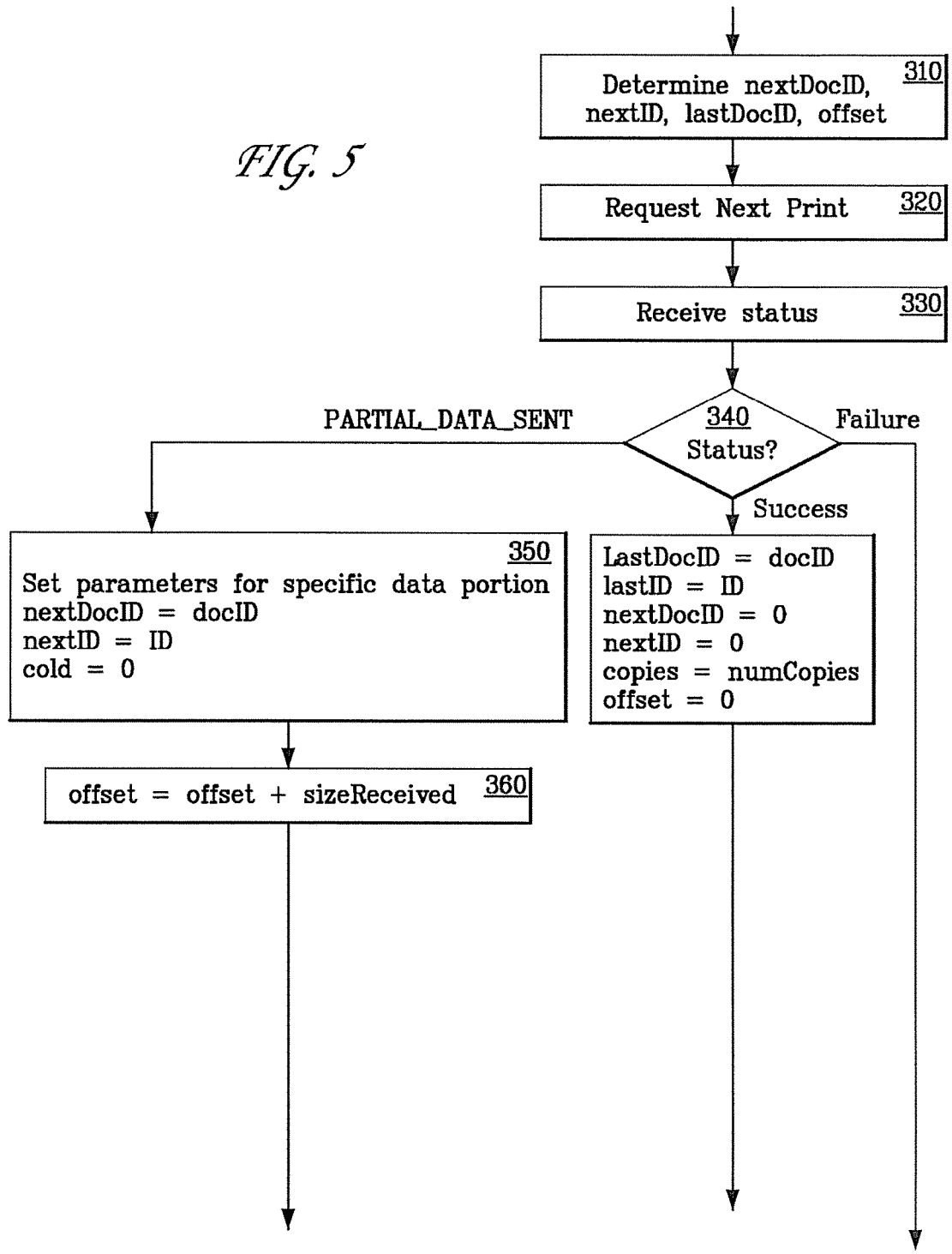
FIG. 5 is a flowchart of an embodiment of the method of this invention at the remote printer depicting a more detailed representation of method for receiving print data portions from the server.

Requesting (step 80, FIG. 2) and receiving (step 90, FIG. 2) print data is described in more detail in FIG. 5. The printer 30 determines identifying data for the next document to be printed and the last document printed, identifying data for the print data portion in the next document to be printed and identifying data for an offset. (The offset allows the restart of transmission that has been interrupted. If the document and the data portion that were being transmitted when the interruption occurred can be identified and the location in the file at which the transmission was interrupted is known, the offset indicates the location in the file at which transmission should resume.) In reply to the print data portion (step 310, FIG. 5), the printer 30 then requests print data from the server 10 (step 320, FIG. 5) and receives from the server 10 a transmission status (step 330, FIG. 5), as well as identifying data for a document and identifying data for a print data portion in that document. These identifying data are generated at the server. Content to print is queued up on the server 10 in a database. The user of the printer 30 can set preferences as what content is to be printed first such as "print oldest first", "print newest first", "print tickets first". This method enables printing a multiple page document. Multipage documents will have one print data portion per page. On the server, they will be grouped together in a single document database table record. Each document will consist of one or more document items. On the server, a document item record will hold the print data portion for the page.

If the printer determines there was a failure, the connection is terminated (step 110, FIG. 2). If a saved status from a previous communication indicates a partial data sent status, the printer 30 receives the remaining part of a partially downloaded data portion by receiving from the server a specific print data portion having a given size (step 350, FIG. 5), and increasing the offset by the given size of the specific print data portion (step 360, FIG. 5).

The print data portions downloaded from the server 10 can be compressed data or not compressed data. If they are compressed as downloaded, the print data portions must be uncompressed at the printer 30 before printing. Compression schemes used can be lossless such as arithmetic coding, Huffman coding or other forms of entropy coding, or lossy, such as transform coding (DCT, wavelet, for example). Compression schemes used can be standard, such as JPEG, or can be tailored to the application.

Figure 6:
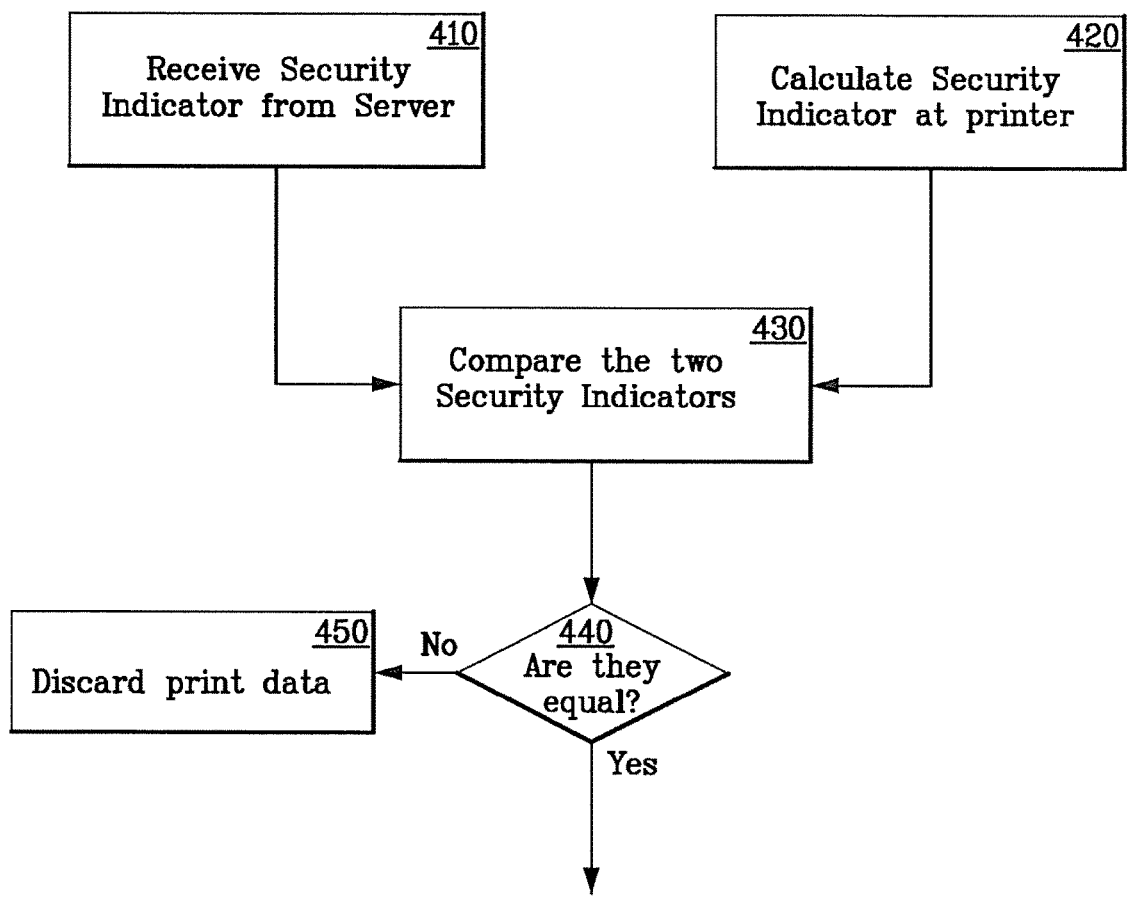
FIG. 6 is a flowchart of an embodiment of the method of this invention at the remote printer depicting a more detailed representation of method for utilizing a security indicator.

Additional verification of correct transmission is obtained by means of security indicators that are transmitted along with the data. Referring to FIG. 6, a security indicator is received from the server 10 for each of said print data portions, where each of the security indicators is calculated from each of the print data portions (step 410, FIG. 6). At the printer 30 a printer calculated security indicator is calculated for each of the print data portions (step 420, FIG. 6). For each print data portion, the printer calculated security indicator is compared with the security indicator provided by the server 10 (step 430, FIG. 6). If the comparison of security indicators yields a difference, a status is generated indicating a transmission failure for the corresponding print data portion (step 440, FIG. 6). The security indicator can be a cyclic redundancy code (CRC), a digital signature such as that calculated by means of the MD5 message digest algorithm or as a simple number known to both printer 30 and server 10 (MAGIC numbers), or a combination of the two. (The MAGIC numbers can also be used to verify that the printer and the server are synchronized.)

When a CRC or a digital signature such as that calculated by means of the MD5 message digest algorithm is used as a security indicator, and the response from the server 10 initiates the transfer of a new print data portion to the printer 30, if the header data returned is error-free, then the CRC value or a digital signature such as that calculated by means of the MD5 message digest algorithm returned from the server 10 should be saved. (As used hereinafter, CRC refers to CRC or a digital signature such as that calculated by means of the MD5 message digest algorithm.) This value represents the CRC of the entire print data portion. If errors then occur in transmission of the print data portion so that only partial data is received, this CRC is to be saved until the entire print data portion has been sent to the printer 30. This may require more than one call to the server 10. After the entire print data portion is received, the CRC value of the print data portion should be computed at the printer and compared to the saved CRC. If they differ, the print data portion must be discarded and the process repeated from the beginning. If the print data portion is being requested with offset greater than zero, then the CRC returned from the server only corresponds to the portion of the print data portion from the offset to the end of the print data portion.

Figure 7:
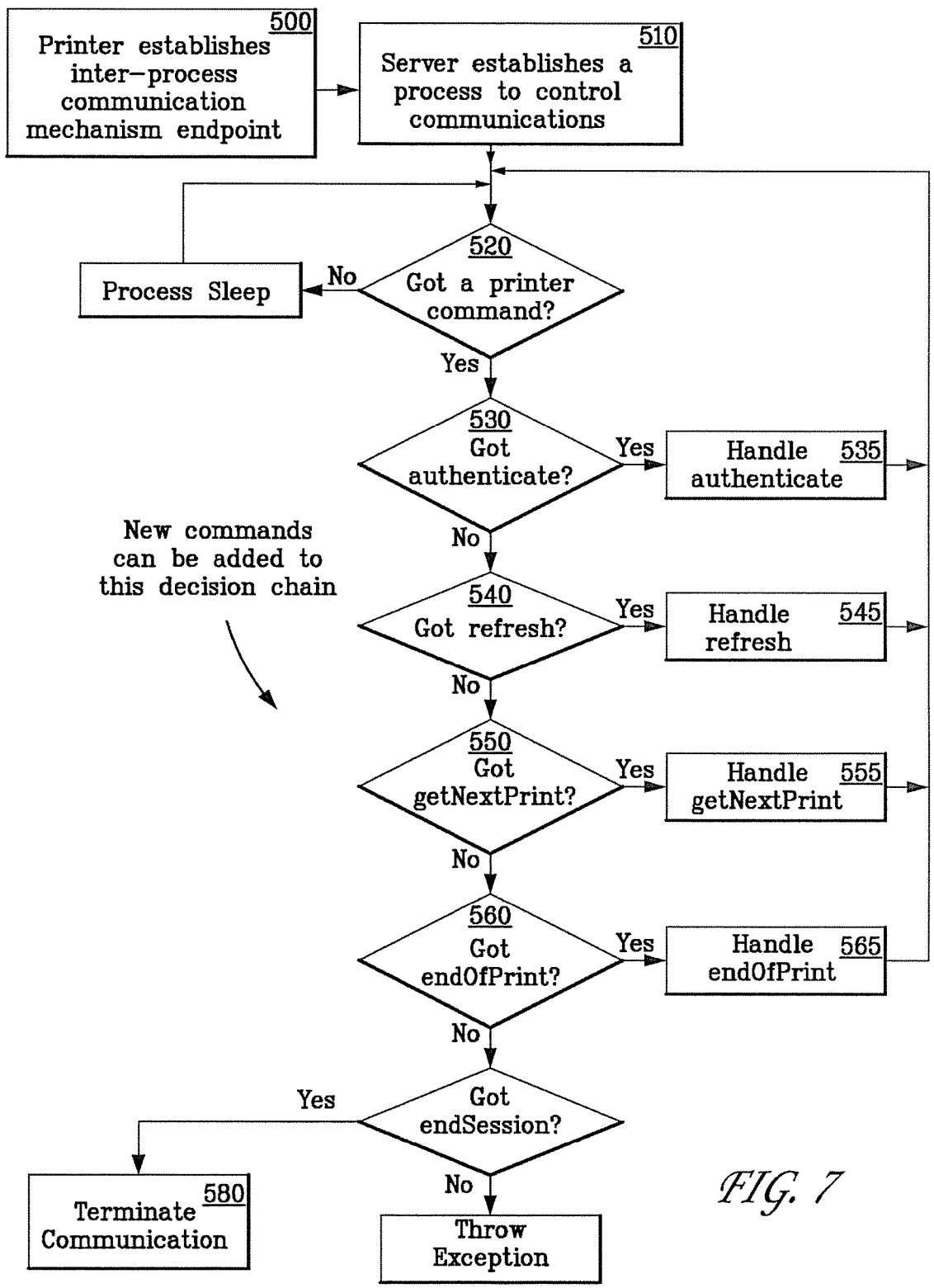
FIG. 7 is a flowchart of an embodiment of the method of this invention as applied at the server.

A method for enabling the server 10 to provide data items to the printer 30 is shown in FIG. 7. A process to control communications through a communication connection endpoint to another communication connection endpoint is established at the server 10 (step 510, FIG. 7), upon the other communication connection endpoint being established at the printer 30 (step 500, FIG. 7). In an embodiment using "sockets", a "socket" to the server 10 is opened at the printer 30. The server 10 starts a process to control communications (a "socket" handler). After a unique process to control communications has been established, the server 10 responds to requests from each connected printer 30 (step 520, FIG. 7). Upon receipt of an authentication request from the printer 30 (step 530, FIG. 7), the server 10 sends an authentication response, status information, a specified number for the data items to be printed and, a specified number for the print data portions to be downloaded to the printer 30 (step 535, FIG. 7). Upon receipt of a request from the printer 30 for an update on the specified numbers for the data items and the print data portions (step 540, FIG. 7), the server 10 sends to the printer 30 an updated specified number of data items to be printed and an updated specified number of print data portions to be downloaded (step 545, FIG. 7). Upon receipt of a request from the printer 30 for print data portions to be downloaded (step 550, FIG. 7), the server 10 sends print data portions to be printed (step 555, FIG. 7). The server 10 receives from the printer 30 notification after each print data portion has been printed (step 560, FIG. 7). The server 10 sends status information to the printer 30 in response to receipt of notification after printing (step 565, FIG. 7). The server 10 terminates the communications connection when a printing session ends or even if an error occurs (step 580, FIG. 7).

Figure 8:
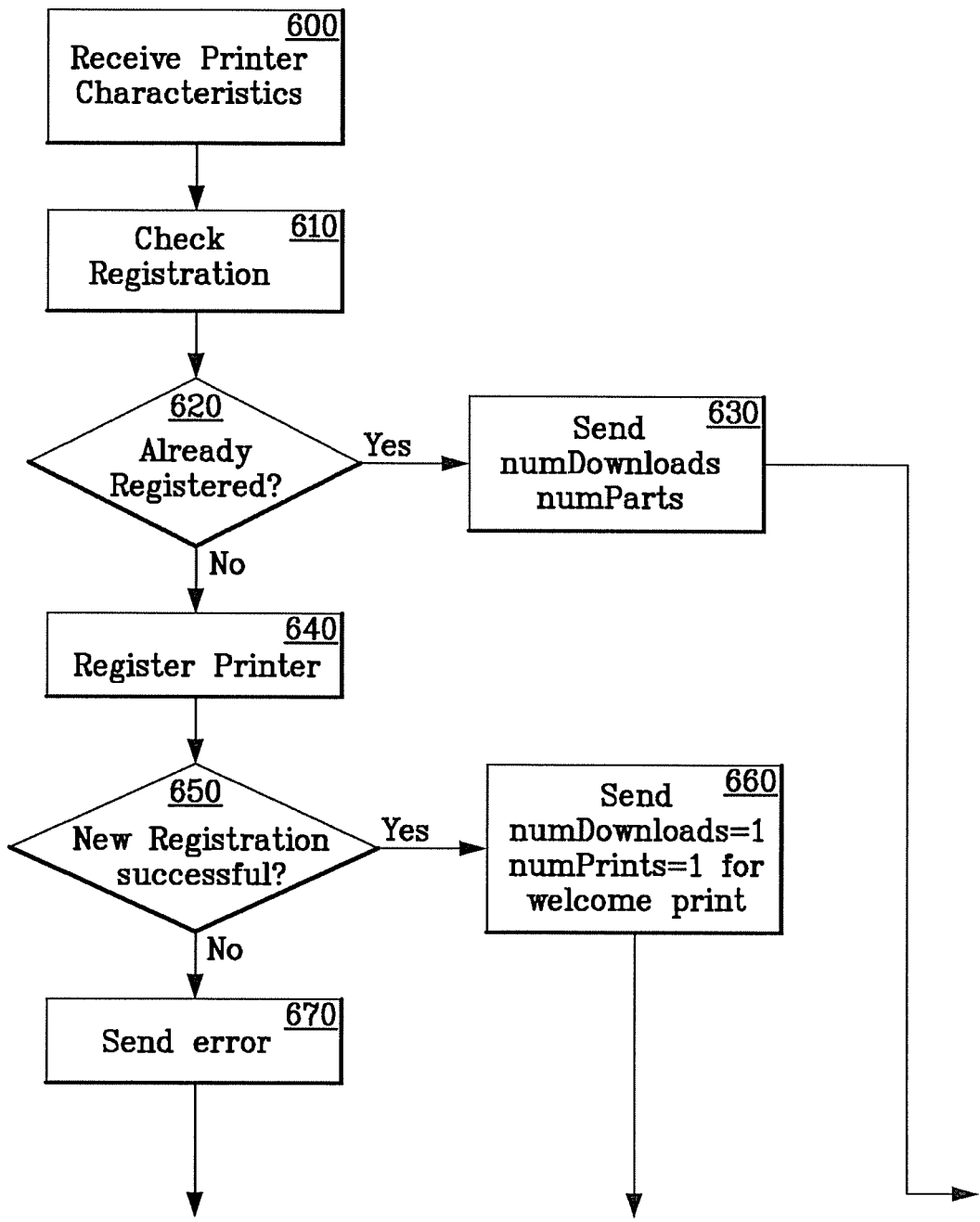
FIG. 8 is a flowchart of an embodiment of the method of this invention as applied at the server depicting a more detailed representation of method for sending to the remote printer an authentication; and, FIG. 9 is a flowchart of an embodiment of the method of this invention s applied at the server depicting a more detailed representation of method for sending print data portions to the remote printer.

The authentication process at the server 10 (step 535, FIG. 7), in response to an authentication request received from the printer 30 (step 530, FIG. 7) is described in more detail in FIG. 8. The server 10 receives from the printer 30 data identifying the characteristics of the printer (step 600, FIG. 8). The data identifying the characteristics of the printer includes the serial number, the model number and the firmware number (revision, model) of the printer 30. The characteristics of the printer are compared to data in a database in order to verify registration (step 610, FIG. 8). If the characteristics of the printer 30 are found in the database, a specified number for the data items to be printed, and a specified number for the print data portions to be downloaded are sent to the printer 30 (step 630, FIG. 8). If the characteristics of the mobile printer are not found in the database, the printer 30 is registered by performing a registration process comprising the steps of:
  registering the characteristics of the mobile printer in the database (step 640, FIG. 8),
  determining if the registration was successful (step 650, FIG. 8),
  sending to the mobile printer a specified number for the data items to be printed, and a specified number for the print data portions to be downloaded, if the registration was successful (step 660, FIG. 8),
  sending to the mobile printer an error status, if the registration was not successful (step 670, FIG. 8).

Figure 9:
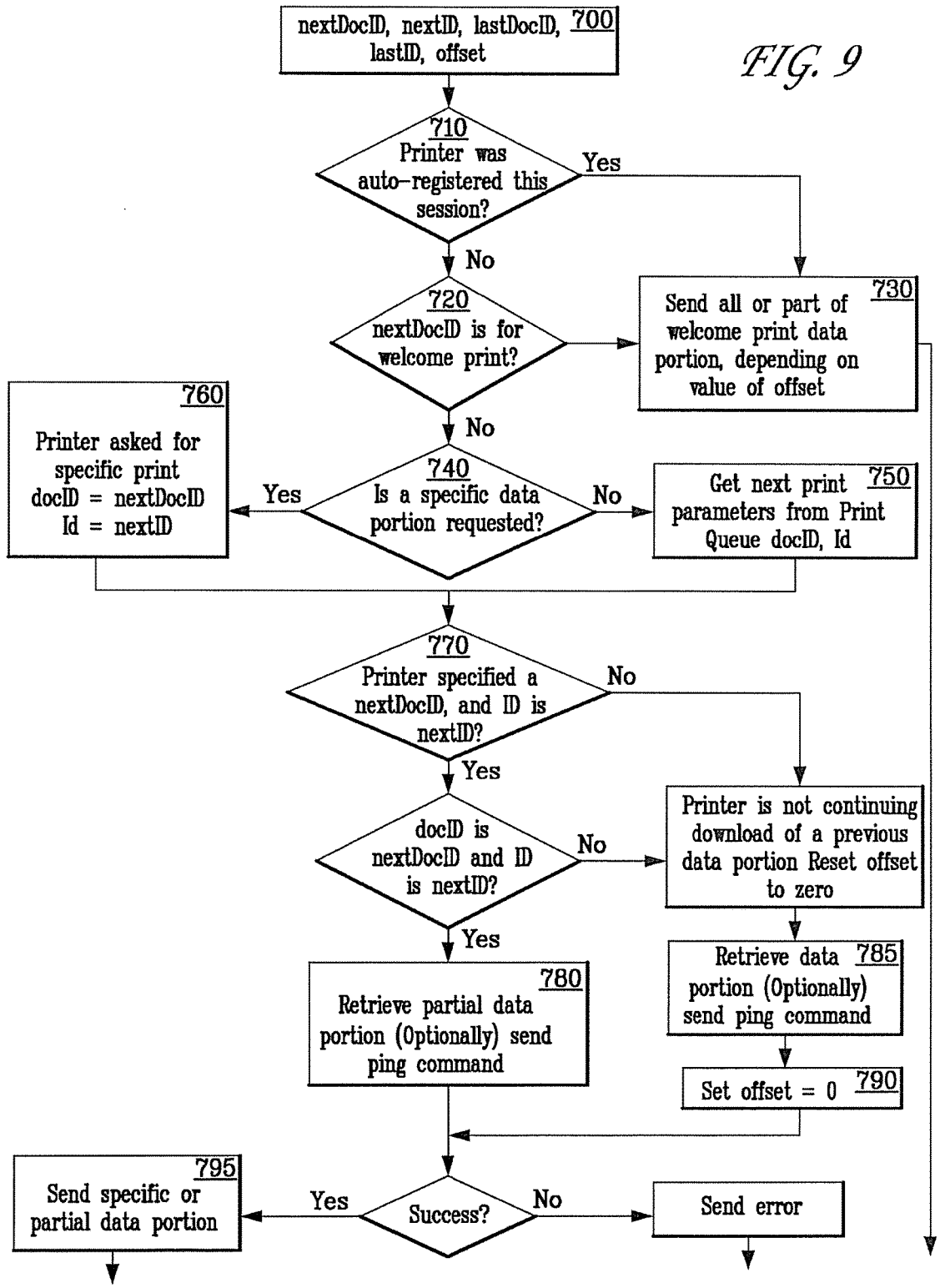

The response to a request from the printer 30 for print data portions to be downloaded (step 550, FIG. 7) is shown in more detail in FIG. 9. The server 10 receives identifying data for a next document to be printed, identifying data for a next print data portion to be printed, identifying data for a last document which was printed, and identifying data for a last print data portion which was printed (step 700, FIG. 9). Then, the server 10 determines if a request for print data portions is immediately subsequent to a mobile printer registration (step 710, FIG. 9). If the request for print data portions is immediately subsequent to a printer registration (step 710, FIG. 9), the server 10 sends to the printer 30 one or more welcome print data portions (step 730, FIG. 9). If the next document to be printed is a welcome print document (step 720, FIG. 9), the server 10 sends to the printer 30 one or more welcome print data portions (step 730, FIG. 9). The server 10, then, determines if a specific data portion is requested by the printer (step 740, FIG. 9). If a specific data portion was not requested by the printer 30, the server 10 sends a next data portion in a print queue (step 750, FIG. 9). If a specific data portion was requested by the printer (step 760, FIG. 9), performing the steps comprising of:
  determining if a partial data portion is requested by the printer (step 770, FIG. 9),
  retrieving the partial data portion (step 780, FIG. 9), if a partial data portion was requested by the printer,
  if a partial data portion was not requested by the printer, performing the steps comprising of:
    retrieving the specific data portion (step 785, FIG. 9),
    setting an offset, one of the item in the data for the printer, equal to zero (step 790, FIG. 9).

Whether a partial data portion or an entire data portion is retrieved, the server 10 sends the partial data portion or the entire data portion to the printer 30 along with the identifying data for the document and identifying data for the print data portion, the security indicator of the data and the offset (step 795, FIG. 9). At the server 10, a security indicator is calculated for each of the print data portions. The print data portions can be compressed data or not compressed data. If they are compressed as downloaded, the print data portions must be compressed at the server 10 before sending to the printer 30. Compression schemes used can be lossless such as arithmetic coding, Huffman coding or other forms of entropy coding, or lossy, such as transform coding (DCT, wavelet, for example).

Compression schemes used can be standard, such as JPEG, or can be tailored to the application.

If a recoverable error occurs, the server 10 returns an error code to the printer 30 (step 795, FIG. 9).

Detailed Embodiment

One embodiment of this invention, the printer 30 initiates a connection to the server 10 over a TCP/IP network. The connection is initiated via a telephone call. This requires the use of a serial line protocol such as Serial Line IP (SLIP) or Point to Point Protocol (PPP). After the printer makes the telephone call to the server and connects to the server 10, the printer 30 communicates to the server 10 through an API described here. These API calls communicate with the server through a socket interface over TCP/IP. The socket is open throughout a series of API calls during the time that the printer is communicating with the server over the telephone call.

The sequence of operations is as follows:
1) Printer makes a telephone call to the server. The call may be routed through an ISP and then over the Internet. TCP/IP connection is established.
2) Printer makes a socket connection to the server at a specific URL (Uniform Resource Locator).

3) Printer communicates via a series of API calls using the underlying bi-directional socket.
4) Printer closes the socket
5) Printer disconnects the call In this embodiment, the functions comprising the API functions are written in the C programming language, although it should be apparent that other programming languages could be used.

The principal API functions are described below.

API Functions

In the API functions to be described, the first word in the function name is the type of variable returned by the function. A void function does not return a variable. The output of the function is in one of the function arguments, which are typically an input structure and an output structure.

Void openSocket

| Printer sets | Call returns |
|---|---|
| IP | Status |
| Phone (number) | |

This function opens a socket connection to the server at a specific IP address or URL over a designated port. If phone is a non-null argument, the call will dial up the server. If the phone connection has already been made at the time of this call, phone should be set to null.

Void closeSocket (Int Hangup)

Closes the socket. If hangup is non-zero the telephone connection is terminated.

Note that for these two functions a telephone call and hangup will normally occur, Each of the following API calls gets a pointer to an input structure in which required fields are to be set before making the call and pointer to an output structure in which values are returned. (To avoid any confusion at the server, the structure should be completely zeroed out before setting the required values.) All the API calls must return even if communication with the server is interrupted. In that case, the computer language code implemented with the API call must be able to timeout and set a status code of TIMEOUT_ERROR into the returning server response argument status field.

Some API calls have an additional argument that is a pointer to a buffer. This is either a place to copy in bytes from the server or to copy out bytes to the server. The type of data being transferred is summarized in the following table.

| Description | Direction | Designation |
|---|---|---|
| Compressed bitmap of print | Server to Printer | Print data portion |
| Bitmap of print | Printer to Server | Bitmap |

The implementation of these functions will consist partially of code to read from an open socket or to write to the same socket. All functions operate as follows:
1) sizeof(input structure) bytes are written into the socket output stream from the input argument structure. The entire structure is written.
2) The functions then read sizeof(output structure) bytes from the socket input stream and copies them into the output argument structure. The function may need to wait until this many bytes are available from the socket. The function must timeout if the data does not become available after a reasonable time interval.
3) The output structure field magic is first examined. If it does not equal MAGIC, then output structure field status must be reset to TRANSMISSION_ERROR and the function should return immediately.
4) For function getNextPrint, additional out.params.print.size bytes are to be read from the socket output stream. It may be necessary to allocate a buffer to hold this data first. (See description of function getNextPrint.) Again, the function must be able to timeout if the data cannot be read after a reasonable time.
5) The function returns and values of the output structure are examined. The specific values to examine depend on the function called. However, status should always be checked.

Void Authenticate

| Printer sets | Server returns |
|---|---|
| magic = MAGIC | magic |
| command = CONNECT | status |
| serialNum | numprints |
| cold | numDownloads |
| modelNum | |
| firmwareNum | |

This function makes the initial call through the socket to the server and authenticate the printer.

For this call, as for others, fields in the returned server response structure that are not specified are to be ignored. Parameter cold is to be set to 1 if the printer was powered down and does not retain any previous image state information. This will cause the server to reset the "in-progress" flags of items to be downloaded to all equal false. In the case where the server has a partial download buffer from the previous connect or has not called the endOfPrint function for the last print, this call should be made with cold set to 0.

There are two possible states at the server:
1) The printer is already registered. In that case the number of prints and the number of downloads needed to fetch these prints are returned. (The number of downloads may be smaller than the number of prints because some downloads may be specified to be printed more than once.)
2) The printer has not been registered. In that case, the server attempts to register the user. A status code is returned indicating that the server was registered or that registration failed. If registration was successful then the returned status is REGISTRATION_SUCCESS. In that case, one or more welcome prints are to be downloaded and printed so that numprints and Downloads will both be returned with value 1.

In case 1) this call may return a status telling the printer to call a function out of the normal sequence. For example, diagnostic commands can be called to return data from the printer to the server or the printer can be directed to make a separate call download new printer parameters.

Void Refresh

| Printer sets | Server returns |
|---|---|
| in.magic = MAGIC | out.magic |
| command = refresh | status |
| | numprints |
| | numDownloads |

This call contacts the server and refreshes the still pending number of prints to download. It is possible that new content will have entered the user's server folder while the printer is connected and this call then allows the printer to keep current with the user's folder. The server will query the database each time this call is made.

Void getNextPrint

| Printer sets | Server returns |
|---|---|
| magic = MAGIC | magic |
| command = GET_NEXT_PRINT | status |
| next.docID | docID |
| last.docID | print.ID |
| last.ID | params.print.numCopies |
| print.offset | params.print.wPixels |
| | params.print.hPixels |
| | params.print.size |
| | params.print.CRC |
| | params.print.sizeReceived |

This call is made to transfer all or part of the print data portion for the next or indicated print. Arguments next.docID and next.ID can both be set to zero or both to integers specifying the document ID and the print ID of the print data portion to be transferred. If both are zero, the server will transfer the next print data portion in the queue. (Note: Setting either next.ID or next.docID to zero, but not both is not allowed.)

This call supports the case where the printer may have previously downloaded part of a print data portion but then the connection between the printer and the server was broken. If transmission is broken, then the call is to set sizeReceived equal to the actual number of bytes read from the socket and out.status is to be reset to PARTIAL_DATA_SENT. If transmission is successful, the call is to set sizeReceived to equal print.size received from the server. If transmission is broken and the printer is not powered down, the printer knows the ID of the document and print and how much of the print data portion was transferred. The printer then makes this call by setting next.docID and next.ID to be the ID's of the interrupted print and an offset into the print data portion where the printer wants to resume the transfer. After a call to getNextPrint where not all print data portion bytes were received, the new print.offset for a subsequent call to getNextPrint should be the previous print.offset plus the returned value of sizeReceived.

Parameters last.docID and last.ID refer to the last print that was successfully transferred fully to the printer and that the printer still has the bitmap in memory. (Note: If the printer was powered down, this information will have been lost and both of these parameters must be set to zero.) If last.docID and Last.ID parameter are non-zero, the server determines if the print data portion to be downloaded represents the print right after print with ID equal to Last.ID within the same document specified by last.docID.

If offset is zero, then the call will allocate a buffer of size large enough to hold the print data and set buffer to point to this pointer. This will be the case if transmission of a picture is just beginning. If transmission had been interrupted and the printer wants to continue at some point in the byte stream, print.offset should be set to that offset and a pointer passed in pointing to the previously allocated buffer which will be of sufficient size to continue the download to the end of the print data portion.

CRC contains a CRC of the print data portion being transferred that was computed at the server. This CRC is of the portion of the print data portion being transmitted during the current call to the server. The printer function must compute a CRC of the received print data portion (consisting of a whole or portion of print data portion from offset to end) and compare to the transmitted CRC. If they differ, status must be reset to TRANSMISSION_ERROR and the function should return immediately.

Void Ping

| Printer sets | Server returns |
|---|---|
| magic = MAGIC | Nothing |
| command = PING | |

This is an optional call that is used to improve the reliability of data transfer over slow connections. During the time that the printer is receiving a data portion from its input socket, the server has already written the entire data portion into its output socket and is waiting for another command from the printer. If the wait time exceeds a timeout period, the server must assume that there is a problem with the printer/server connection. In this case, the server closes the socket. To prevent this event from occurring in cases where the connection is slow, the printer can send a series of ping commands to the server. Each ping command received causes the server to reset a time variable to the current time. This variable is compared periodically to see if the timeout interval between commands from the printer has been exceeded. Hence, by sending ping commands, the printer informs the server that the connection is still open and functioning and that the server should not close the socket. This is shown in FIG. 9 for printer actions and FIG. 12 for server actions.

Void endOfPrint

| Printer sets | Server returns |
|---|---|
| magic = MAGIC | magic |
| command = END_OF_PRINT | status |
| params.endPrint.status | |
| params.endPrint.docID | |
| params.endPrint.ID | |

This call is to be made after each print comes out of the printer. If the same print is directed to be printed multiple times, then this call is to be made multiple times, once for each physical print made. The server will update the database each time this call is made. The call to the server is timed to coincide with the actual physical printing so that the user cannot break the connection to the server after receiving the print but before endOfPrint is called and, henceforth, have the same content printed again.

Use of the API Functions

Printer Behavior

An embodiment of a sequence of API calls to be made by the printer and printer behavior, as a function of the values returned by making these calls, is shown in the following series of Figures.

For means of illustration, the following printer variables will be defined:

| Variable | Description |
|---|---|
| lastDocID | The index of the last document to be successfully downloaded to the printer |

| Variable | Description |
| --- | --- |
| lastID | The index of the last print of the last document to be successfully downloaded to the printer |
| nextDocID | The index of the next document that the printer is asking the server to download or zero if the printer is just asking for the next document in the server queue |
| nextID | The index of the next print of the next document or zero |
| offset | Current offset into a download buffer |
| CRC | The CRC of an entire print data portion, when sending an entire print data portion, as computed as the server and returned by a call to getNextPrint when in.params.pring.offset is set to zero (or the CRC of a partial print data portion, when sending a partial, print data portion). |
| EndPrintFailure | A flag to indicate that the last call to endOfPrint returned a failed status. |
| Cold | A flag used to set in.connect.cold when calling authenticate |
| Status | The status returned by any call through the API |
| Prints | The number of hard-copy prints, as communicated from the server to the printer |
| Dowloads | The number of complete data segments pending to be downloaded from the server to the printer |
| Copies | The number of copies to be made of a print |

These variables are used to hold state during the time the printer is powered up. When the printer is powered down variables must be reset as follows:

LastDocID=0
LastID=0
nextDocID=0
nextID=0
offset=0
CRC=0
endPrintFailure=false
cold=1

The variables are to maintain their current values when the printer is both connected and disconnected from the server, as long as the printer is not powered down.

Figure 10:
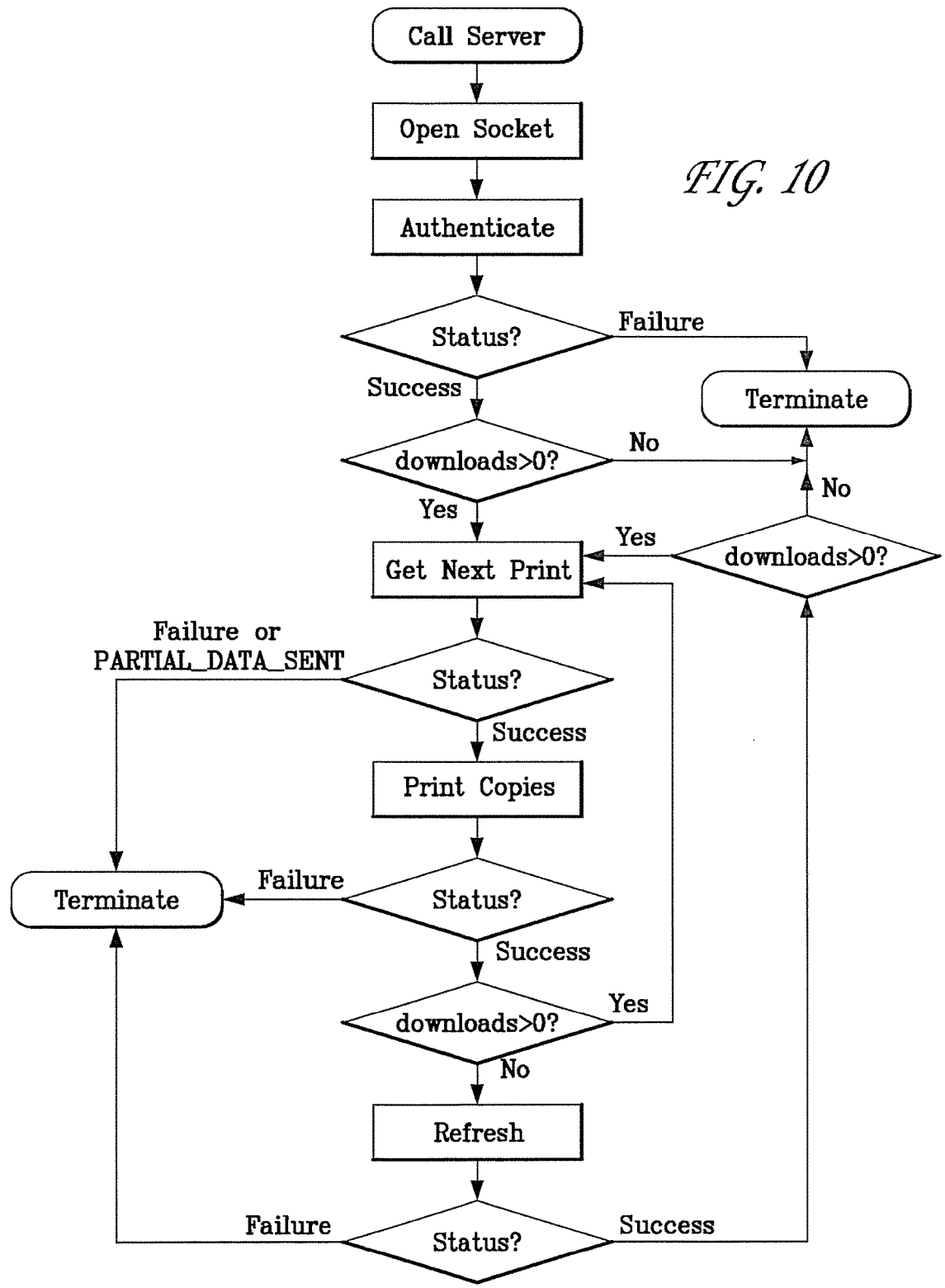
FIG. 10 depicts a flowchart of an embodiment of a sequence of API function calls to be made by the printer.

The diagram showing the overall flow of the printer is shown in FIG. 10.

Figure 11:
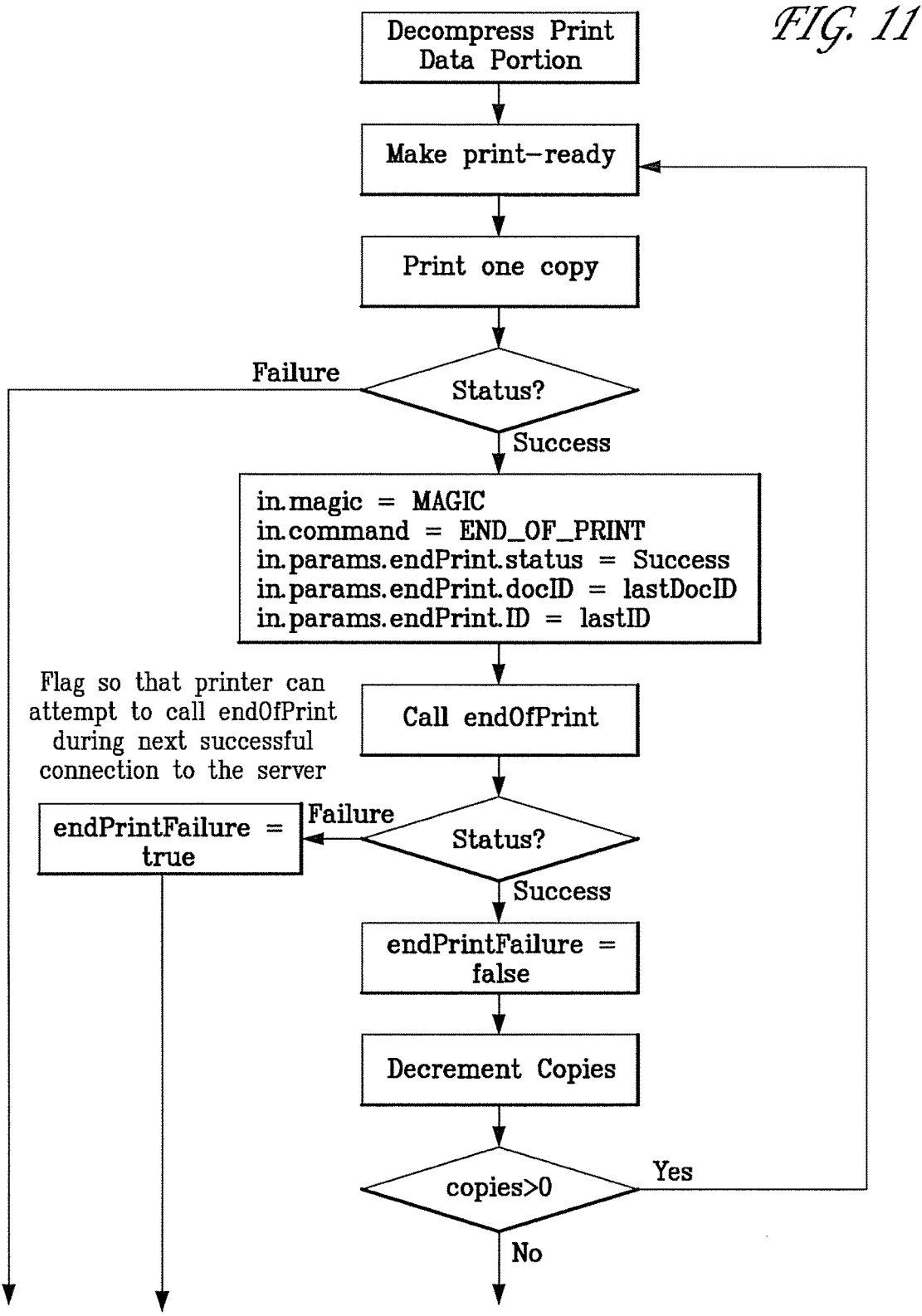
FIG. 11 depicts a flowchart of an embodiment of printer logic during the printing of one or more copies of a print data portion.

FIG. 10 does not show all details of the printer/server communications control flow. Various sub-elements of control can be understood by reference to FIGS. 3, 4 and FIG. 11. These sub-elements refer to the corresponding procedure blocks in FIG. 10. The procedure blocks for refresh and terminate call the refresh and endOfSession functions. FIG. 11 shows printer logic during the printing of one or more copies of a print data portion.

Server Behavior

Figure 12:
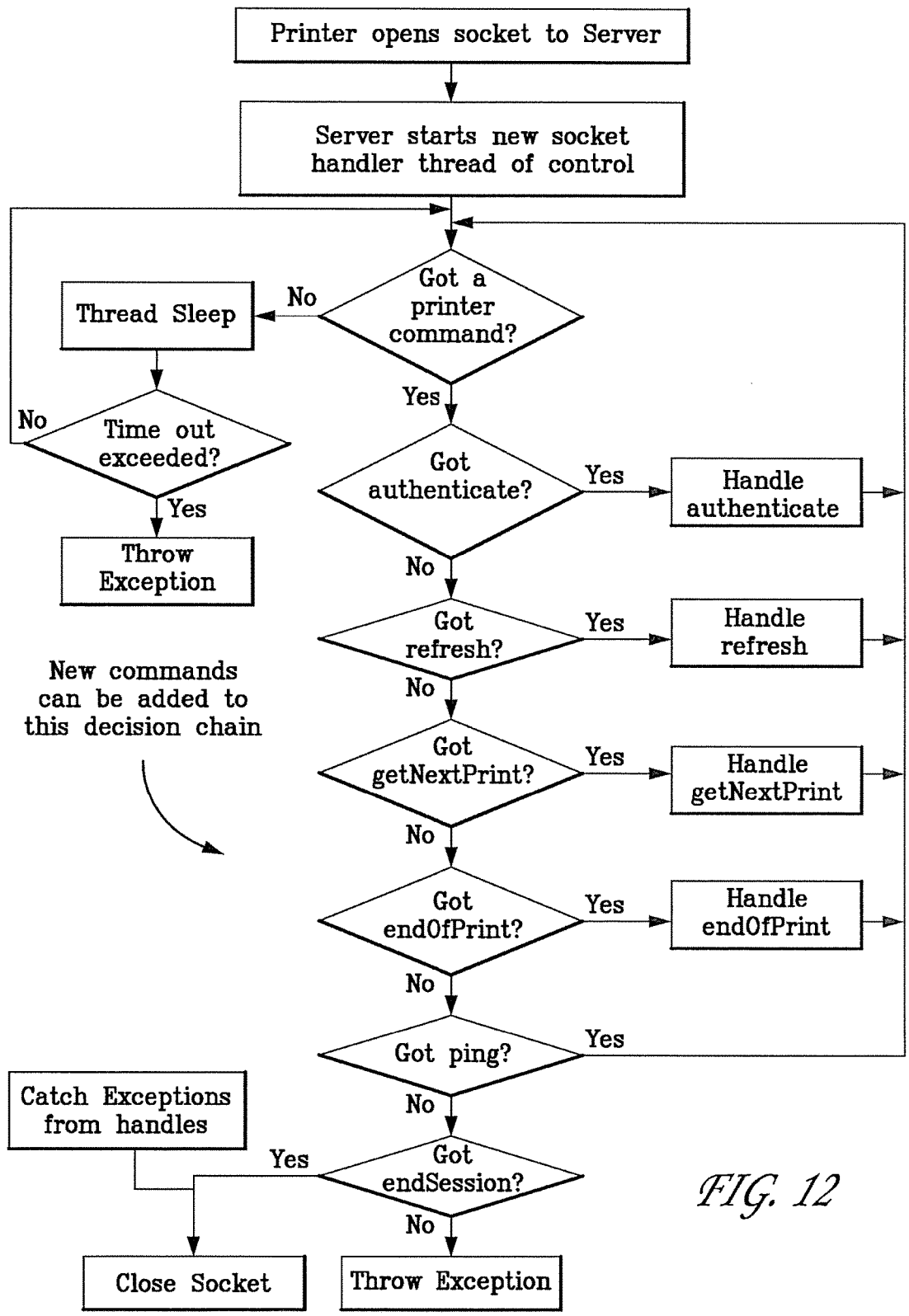
FIG. 12 depicts a flowchart of an embodiment of a sequence of responses at the server to printer function calls.

To complete the description of the printer/server interface, an embodiment of the behavior of the server when responding to API commands sent by the printer has to be described. FIG. 12 shows an embodiment of the server main control loop. This loop is replicated for each printer that connects to the server in a separate thread of control. FIG. 12 is best understood by reference to FIGS. 8 and 9.

Structures

In one embodiment, the first two structures are used to send/receive commands and parameters for many of the interactions between the printer and server through the socket connection. These structures are defined so that they will be a fixed, known length for all commands. This will allow the printer and server to read/write the structures as a single block of bytes of known size. It is assumed that sizeof(int) is 4 bytes integers have been used throughout. This is important since, in this embodiment, the server is implemented in the Java programming language and the Java code needs to read and write these data blocks correctly. Note that both structures begin with a fixed magic number that is known to both the printer and the server.

The following structure is used by the printer when sending commands to the server.

```
struct prnCmd {
        int magic;    // Prefix for transfer check. Must be 0x4C535054 ("LSPT")
        int command;
        // All commands with parameters have their own struct
        //within union params so that prnCmd is always the same size
        union {
                struct {
                        int serialNum;      // of printer
                        int cold;           //Flag
                        unsigned char modelNum[8];        //0-term C String
                } connect;
                struct {
                        struct {
                                int docID;    // of doc of requested print
                                int ID; // of requested print
                        } next;
                        struct {
                                int docID;    // of last doc
                                int ID; // of last print
                        } last;
                        int offset;         // Requested offset into capsule
                } print;
                struct {
                        int status;         //Printing status
                        int docID;          // of doc of print printed
                        int ID;       // of print printed
                } endPrint;
        } params;
}
```

The following structure is used by the server to return status to the printer.

```
struct svrRsp {
        int magic;       // Prefix for xfr check. Must be 0x4C535054 ("LSPT")
        int status;
        // All commands with parameters have their own struct
        // within union params so that svrRsp is always the same size
        union {
            struct {
                int numPrints;        // Num prints pending
                int numDownloads;    // Num of downloads required to get prints
            } connect; // Used by both connect and refresh command
            struct {
                int docID;           // Document ID of the print
                int ID;              // ID of the print
                int numCopies;       // Number of copies of the print
                int wPixels;         // Pixels across width of the paper
                int hPixels;         // Pixels along length of the paper
                int size;            // Size of portion of capsule sent
                int CRC;             // A crc of portion of capsule sent
                int sizeReceived;    // Actual size of capsule received
            } print;
            unsigned char phoneNumber[12]; // Phone number digits
        } params;
};
```

Security Enhancements

The following are two methods for enhancing the security and reliability of communications between the printer and the server.

1) Immediately after the socket connection is made, the server will send a challenge phrase to the printer. This can consist of either a single integer value or a buffer of byte data of fixed size. The data will be randomly generated on the server. The printer will run an algorithm over the data to produce a hash value that will be returned to the server. The server will run the same algorithm over the original data sent and compare the results. If they match, the connection is allowed to proceed. If they do not, the server will immediately close the socket. A simple hash algorithm that takes advantage of code already present on the server is to simply run the CRC algorithm over the challenge data and return the CRC value to the server 2) Right before endOfSession is called a new API call will be made. In this call, the printer will send some dynamic data to the server. This could be a randomly generated number or some data describing the operation of the server during the current session. The server receives this data and stores it into the database. If successful, a code of SUCCESS is returned to the printer. The printer then stores the same data in persistent memory. When the printer next connects to the server, the printer sends the same data. The server checks against what was saved in the database. If they agree, the connection is allowed to continue. If they disagree, then the server will send a second challenge phrase that is hashed by the printer using a different algorithm. The result is sent back to the server where it is checked by running the corresponding algorithm similar to 1) above. Since this situation will rarely occur, it makes it much less likely that a hostile process "listening" to the Internet data transfer would be able to gather enough data to reverse engineer the second hashing algorithm.

In addition to these application-level security measures, there are measures that are provided by the software products that the printer and server are implemented with. The server can prevent denial of service attacks by setting a parameter that limits the size of a data block received at the server to a known, maximum size. Secondly, the printer will initially connect with a user name and password that is implemented below the application level software described herein. Third, serial line protocols used over modems such as PPP implement a Challenge Handshake protocol (CHAP), which is used to verify the identity of a client using a 3-way handshake scheme.

Printer and Server Implementations

The methods of this invention can be implemented by a printer system and a server system comprising means for implementing the functions described above. At least one processor and supporting memory at the printer and, similarly, at least one processor and supporting memory at the server can be used to implement the methods of this invention. Processors can be dedicated processors, or general purpose processors and supporting memory could be any computer accessible memory.

One additional advantage of the present invention is the reduction of loading of the memory at the server. For servers operating under TCP, when a connection closes, in order to block further connections, TIME_WAIT states are kept in the server memory (T. Faber, J. Touch, W. Yue, "The TIME_WAIT state in TCP and Its Effect on Busy Servers", http://www.isi.edu/touch/pubs/infocomm99/infocomm99-web/). The present method reduces the memory loading by:

a) sending an endOfSession message to the server at the end of the printing session causing the server to close the socket at the server without responding to the printer, and, b) closing the socket at the printer after sending the endOfSession message. This action eliminates the need for a server to maintain a TIME_WAIT state for each recently disconnected printer. This reduces server memory requirements and increases processing speed.

The complete two way communication between the printer and the server, which is described above, enables the remote operation of the printer (without a companion computer). The protocol disclosed above enables complete two-way communication between output devices and servers and ensures reliable communication by allowing the transmission of information to restart at the point of interruption, if interrupted.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Although the above description refers to a specific embodiment, it should be apparent that other embodiments are within the scope of the invention. For example, rather than sending a notification to the server after every print, such notification could be sent after a number of prints. Other similar modifications are within the scope of the art.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-accessible storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read and/or write.

Elements and components described herein may be further divided into additional components or joined together to form fewer components for performing the same functions.

Although the invention has been described with respect to various embodiments, it should be realized this invention is also capable of a wide variety of further and other embodiments within the spirit and scope of the appended claims.

What is claimed:

1. A method comprising:
   receiving, by a computing device from a remote printer, data identifying one or more characteristics of the remote printer, wherein the computing device comprises at least one processor and memory and is communicatively coupled to the remote printer via a network;
   verifying, by the computing device, that the remote printer has been registered with the computing device; and
   sending, from the computing device to the remote printer, an indication of a number of data items to be printed and an indication of a number of print data items to be downloaded, wherein the remote printer is configured to download the print data items.

2. The method of claim 1, wherein verifying that the remote printer has been registered with the computing device comprises comparing the one or more characteristics of the remote printer with data in a database.

3. The method of claim 1, further comprising determining to terminate a communication connection with the remote printer based at least in part on a comparison of a number of items printed by the remote printer and the number of data items to be printed.

4. The method of claim 1, further comprising:
   sending, from the computing device to the remote printer, an indication of an updated number of data items to be printed; and
   determining to terminate a communication connection with the remote printer based at least in part on a comparison of a number of items printed by the remote printer and the updated number of data items to be printed.

5. The method of claim 1, further comprising:
   sending, from the computing device to the remote printer, an indication of an updated number of data items to be printed; and
   receiving, by the computing device from the remote printer, a request for the updated number of data items to be printed.

6. The method of claim 1, further comprising:
   sending, from the computing device to the remote printer, an indication of an updated number of data items to be printed; and
   sending, from the computing device to the remote printer, an indication of an updated number of print data items to be downloaded in response to sending the indication of the updated number of data items to be printed.

7. The method of claim 1, further comprising establishing, by the computing device, a communication connection with the remote printer in response to verifying that the remote printer has been registered with the computing device.

8. The method of claim 7, wherein establishing the communication connection comprises establishing a connection endpoint at the computing device and receiving a communication from a connection endpoint at the remote printer.

9. A computer readable storage device having computer-executable instructions embodied thereon, the instructions comprising:
   instructions to receive, by a computing device from a remote printer, data identifying one or more characteristics of the remote printer;
   instructions to verify, by the computing device, that the remote printer has been registered with the computing device; and
   instructions to send, from the computing device to the remote printer, an indication of a number of data items to be printed and an indication of a number of print data items to be downloaded, wherein the remote printer is configured to download the print data items.

10. The computer readable storage device of claim 9, wherein the instructions to verify that the remote printer has been registered with the computing device further comprise instructions to compare the one or more characteristics of the remote printer with data in a database.

11. The computer readable storage device of claim 9, the instructions further comprising instructions to determine to terminate a communication connection with the remote printer based at least in part on a comparison of a number of items printed by the remote printer and the number of data items to be printed.

12. The computer readable storage device of claim 9, the instructions further comprising:
    instructions to send, from the computing device to the remote printer, an indication of an updated number of data items to be printed; and instructions to determine to terminate a communication connection with the remote printer based at least in part on a comparison of a number of items printed by the remote printer and the updated number of data items to be printed.

13. The computer readable storage device of claim 9, the instructions further comprising:
   instructions to send, from the computing device to the remote printer, an indication of an updated number of data items to be printed; and
   instructions to receive, by the computing device from the remote printer, a request for the updated number of data items to be printed.

14. The computer readable storage device of claim 9, the instructions further comprising:
   instructions to send, from the computing device to the remote printer, an indication of an updated number of data items to be printed; and
   instructions to send, from the computing device to the remote printer, an indication of an updated number of print data items to be downloaded in response to sending the indication of the updated number of data items to be printed.

15. The computer readable storage device of claim 9, the instructions further comprising instructions to establish, by the computing device, a communication connection with the remote printer in response to verifying that the remote printer has been registered with the computing device.

16. The computer readable storage device of claim 15, wherein the instructions to establish the communication connection comprise instructions to establish a connection endpoint at the computing device and instructions to receive a communication from a connection endpoint at the remote printer.

17. A computing device for managing a remote printer, the computing device comprising:
   at least one processor; and
   at least one memory in communication with the at least one processor, the at least one memory having instructions embodied thereon that, in response to execution by the at least one processor, cause the computing device to:
      receive, from a remote printer, data identifying one or more characteristics of the remote printer,
      verify that the remote printer has been registered with the computing device, and
      send, to the remote printer, an indication of a number of data items to be printed and an indication of a number of print data items to be downloaded, wherein the remote printer is configured to download the print data items.

18. The computing device of claim 17, wherein verifying that the remote printer has been registered with the computing device comprises comparing the one or more characteristics of the remote printer with data in a database.

19. The computing device of claim 17, the instructions further comprising instructions that, in response to execution by the at least one processor, cause the computing device to determine to terminate a communication connection with the remote printer based at least in part on a comparison of a number of items printed by the remote printer and the number of data items to be printed.

20. The computing device of claim 17, the instructions further comprising instructions that, in response to execution by the at least one processor, cause the computing device to determine to terminate a communication connection with the remote printer based at least in part on a comparison of a number of items printed by the remote printer and an updated number of data items to be printed.

* * * * *